US009625798B2

(12) United States Patent
Kase

(10) Patent No.: US 9,625,798 B2

(45) Date of Patent: Apr. 18, 2017

(54) LIGHT SOURCE UNIT AND IMAGE PROJECTION SYSTEM

(71) Applicant: CASIO COMPUTER CO., LTD., Shibuya-ku, Tokyo (JP)

(72) Inventor: Toshifumi Kase, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 76 days.

(21) Appl. No.: 14/664,459

(22) Filed: Mar. 20, 2015

(65) Prior Publication Data

US 2015/0338725 A1 Nov. 26, 2015

(30) Foreign Application Priority Data

May 22, 2014 (JP) ................................ 2014-106042

(51) Int. Cl.

| | |
|---|---|
| ***G03B 21/16*** | (2006.01) |
| ***G03B 21/20*** | (2006.01) |
| ***H04N 5/74*** | (2006.01) |
| ***H04N 9/31*** | (2006.01) |
| *G03B 21/14* | (2006.01) |

(52) U.S. Cl.

CPC ......... *G03B 21/16* (2013.01); *G03B 21/2013* (2013.01); *G03B 21/2093* (2013.01); *H04N 5/74* (2013.01); *H04N 9/315* (2013.01); *H04N 9/3144* (2013.01); *G03B 21/145* (2013.01)

(58) Field of Classification Search

CPC ...... G03B 21/16; G03B 21/18; G03B 21/145; G02F 1/133382; G02F 1/133385

See application file for complete search history.

(56) References Cited

U.S. PATENT DOCUMENTS

| | | | | |
|---|---|---|---|---|
| 2007/0115438 A1* | 5/2007 | Tsubura | G03B 21/16 353/57 | |
| 2009/0107653 A1* | 4/2009 | Jiang | F28D 15/0233 165/80.3 | |
| 2009/0290131 A1* | 11/2009 | Kim | G03B 21/16 353/61 | |
| 2010/0171935 A1* | 7/2010 | Yamagishi | G03B 21/16 353/52 | |

(Continued)

FOREIGN PATENT DOCUMENTS

| | | |
|---|---|---|
| CN | 102591115 A | 7/2012 |
| CN | 203397070 U | 1/2014 |
| JP | 2012123967 A | 6/2012 |

OTHER PUBLICATIONS

Chinese Office Action (and English translation thereof) dated Jun. 15, 2016, issued in counterpart Chinese Application No. 201510124788.1.

*Primary Examiner* — Sultan Chowdhury

(74) *Attorney, Agent, or Firm* — Holtz, Holtz & Volek PC

(57) ABSTRACT

There is provided a light source unit including a first light source, a second light source, a first heat sink for the first light source which is disposed to a side of the first light source, a second heat sink for the second light source which is disposed to a side of the second light source, and a first cooling fan which is disposed between the first heat sink and the second heat sink, wherein the first light source and the first heat sink are connected together by a first heat pipe via a bulkhead, and wherein the second light source and the second heat sink are connected together by a second heat pipe via the bulkhead.

16 Claims, 15 Drawing Sheets

100 (150) 151 125 221 (121) 123 (121) 122 (110) 111 185 145 119 (110) 183 181 140 (141) 161 113 (110)

(56) References Cited

U.S. PATENT DOCUMENTS

2011/0181842 A1* 7/2011 Kanno .................. G03B 21/16
353/52
2011/0310557 A1* 12/2011 Ooe ....................... G06F 1/203
361/692
2012/0133903 A1* 5/2012 Tanaka ............... G03B 21/2013
353/31
2012/0140185 A1 6/2012 Masuda
2012/0182530 A1 7/2012 Lin et al.
2012/0287954 A1* 11/2012 Saruwatari .......... H01S 5/02469
372/34

* cited by examiner

LIGHT SOURCE UNIT AND IMAGE PROJECTION SYSTEM

CROSS-REFERENCE TO RELATED APPLICATION

This patent application is based upon and claims the benefit of priority under 35 USC 119 from the prior Japanese Patent Application No. 2014-106042 filed on May 22, 2014, the entire disclosure of which, including the description, claims, drawings and abstract, is incorporated herein by reference.

BACKGROUND OF THE INVENTION

Field of the Invention

The present invention relates to a light source unit and an image projection system including this light source unit.

Description of the Related Art

In these days, data projectors are used on many occasions as an image projection system which projects an image of a screen of a personal computer or a video image, as well as images based on image data which is stored on a memory card or the like on to a screen. Conventionally, the mainstream of these projectors has been those which utilize a high-intensity discharge lamp as a light source. In recent years, however, there have been made many developments and proposals on light source units which use, as light emitting elements, light emitting diodes (LEDs), laser light emitting devices, organic electroluminescent devices or luminescent materials.

The Japanese Unexamined Patent Application No. 2012-123967 discloses an image projection system. In this image projection system, a laser light emitting device is used as a light source which emits a laser beam part of which is used as excitation light to illuminate a luminescent material to thereby cause it to emit luminescent light. Then, light source light for forming bright image is generated by combination of the laser beam and the luminescent light, enabling the emission of highly bright image forming light. Further, various types of similar image projection systems have been proposed, some of which are now provided for sale on the market.

With such a light source unit which uses a semiconductor light emitting device such as a laser light emitting device or the like and a luminescent light emitting plate on which a luminescent material is provided, it is easy to form bright three primary colors of light, enabling the projection of a bright color image. However, the high-intensity light source tends to have a high heating value, and as a result of that, it has been difficult to use it in order to make up a light source unit which is small in size and which has high cooling and heat dissipating effects.

Additionally, in the event that lenses and mirrors get dirty with time, although it is small, there is a possibility that the brightness of an image produced is deteriorated. As this occurs, not only is the brightness of the image deteriorated, but also a reduction in tone or clarity of a projected image is caused. Further, the heating value in the optical system is increased. Thus, light sources of this type have caused various problems including those described above.

SUMMARY OF THE INVENTION

Thus, the invention has been made in view of these situations, and an object thereof is to provide an optical apparatus which can dissipate effectively not only heat produced by a light source unit but also heat produced from the whole of the optical apparatus which includes the light source unit and an image projection system which includes the optical apparatus.

According to an aspect of the invention, there is provided a light source unit including a first light source, a second light source, a first heat sink for the first light source which is disposed to a side of the first light source, a second heat sink for the second light source which is disposed to a side of the second light source, and a first cooling fan which is disposed between the first heat sink and the second heat sink in such a way that a blowing direction becomes substantially parallel to a direction in which the first heat sink and the second heat sink are aligned, wherein the first light source and the first heat sink are connected together by a first heat pipe via a bulkhead, and wherein the second light source and the second heat sink are connected together by a second heat pipe via the bulkhead.

According to another aspect of the invention, there is provided a projector including a light source unit including a first light source, a second light source, a first heat sink for the first light source which is disposed to a side of the first light source, a second heat sink for the second light source which is disposed to a side of the second light source, and a first cooling fan which is disposed between the first heat sink and the second heat sink in such a way that a blowing direction becomes substantially parallel to a direction in which the first heat sink and the second heat sink are aligned, wherein the first light source and the first heat sink are connected together by a first heat pipe via a bulkhead, and wherein the second light source and the second heat sink are connected together by a second heat pipe via the bulkhead, a display device on to which light emitted from the light source unit is shone to form image light, a projection optical system which projects the image light formed by the display device on to a screen, and a projector control unit which controls the display device and the light source unit.

DETAILED DESCRIPTION OF THE PREFERRED EMBODIMENTS

Figure 1:
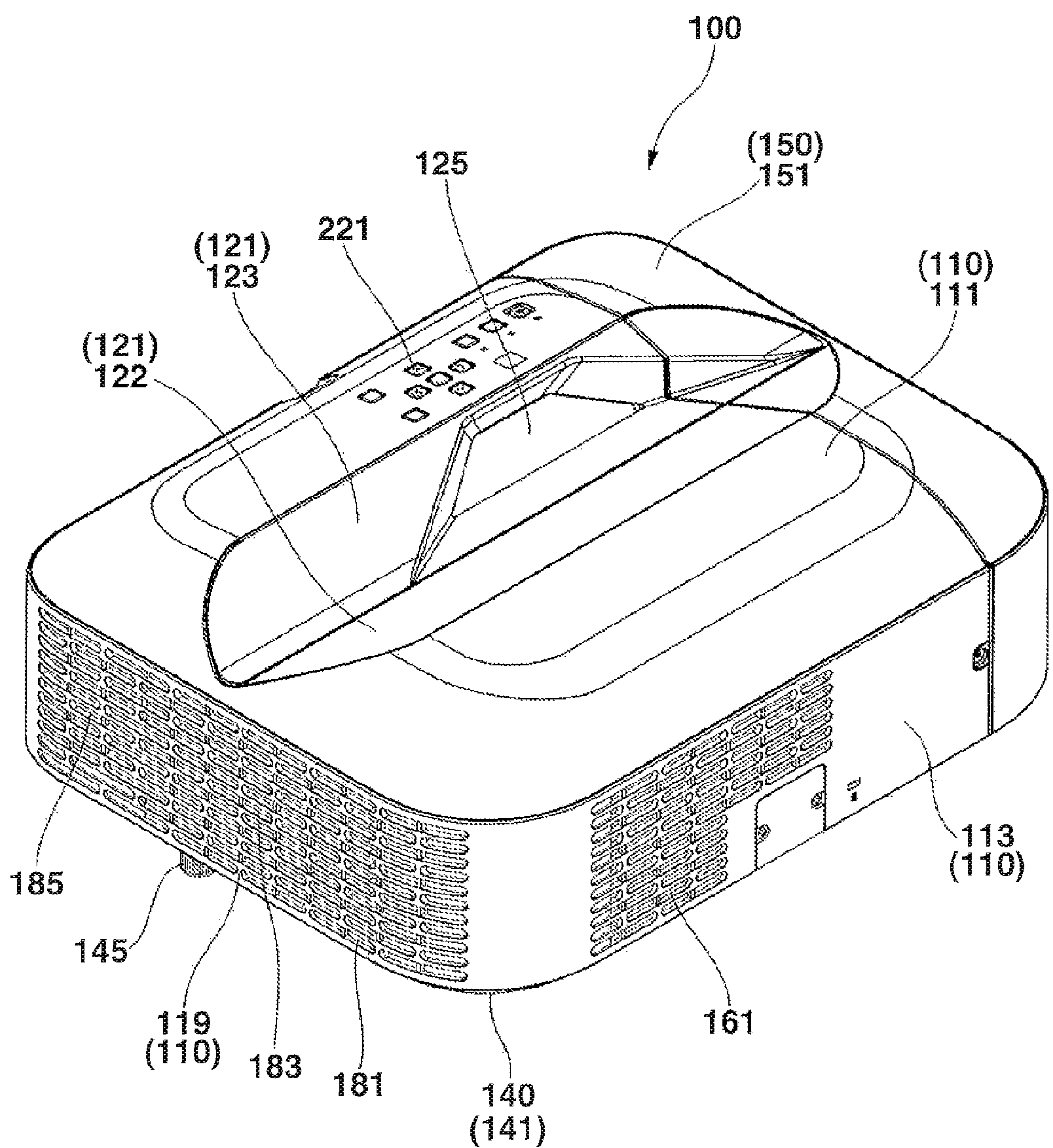
FIG. 1 is an external perspective view showing an example of a projector according to an embodiment of the invention.

Hereinafter, an embodiment of the invention will be described in detail by using the accompanying drawings. FIG. 1 is an external perspective view of a projector 100 which is an image projection system. In this embodiment, when left and right are referred to in relation to the projector 10, they denote, respectively, left and right with respect to a projecting direction, and when front and rear are referred to in relation to the projector 100, they denote, respectively, front and rear with respect to the projecting direction of the projector 100. In FIG. 1, a right downward direction indicates a front of the projector 100.

As shown in FIG. 1, the projector 100 has a substantially rectangular parallelepiped shape. In the projector 100, various devices and circuit boards which are fixed to an upper surface of a bottom panel 141 of a lower case 140 are covered by an upper case 110.

A front surface side outside air inlet port 161 is formed in a front panel 113 of the upper case 110 which makes up a part of a casing of the projector 100, and a side surface front inside air outlet port 181, a side surface central inside air outlet port 183 and a side surface rear inside air outlet port 185 are formed, respectively, at front, central and rear portions of a right side panel 119 of the upper case 110.

Legs 145 with a screw portion are attached to three locations on the bottom plate 141 of the lower case 140, so that the height of the projector 100 can be adjusted by tightening or loosening the screw portions.

Figure 2:
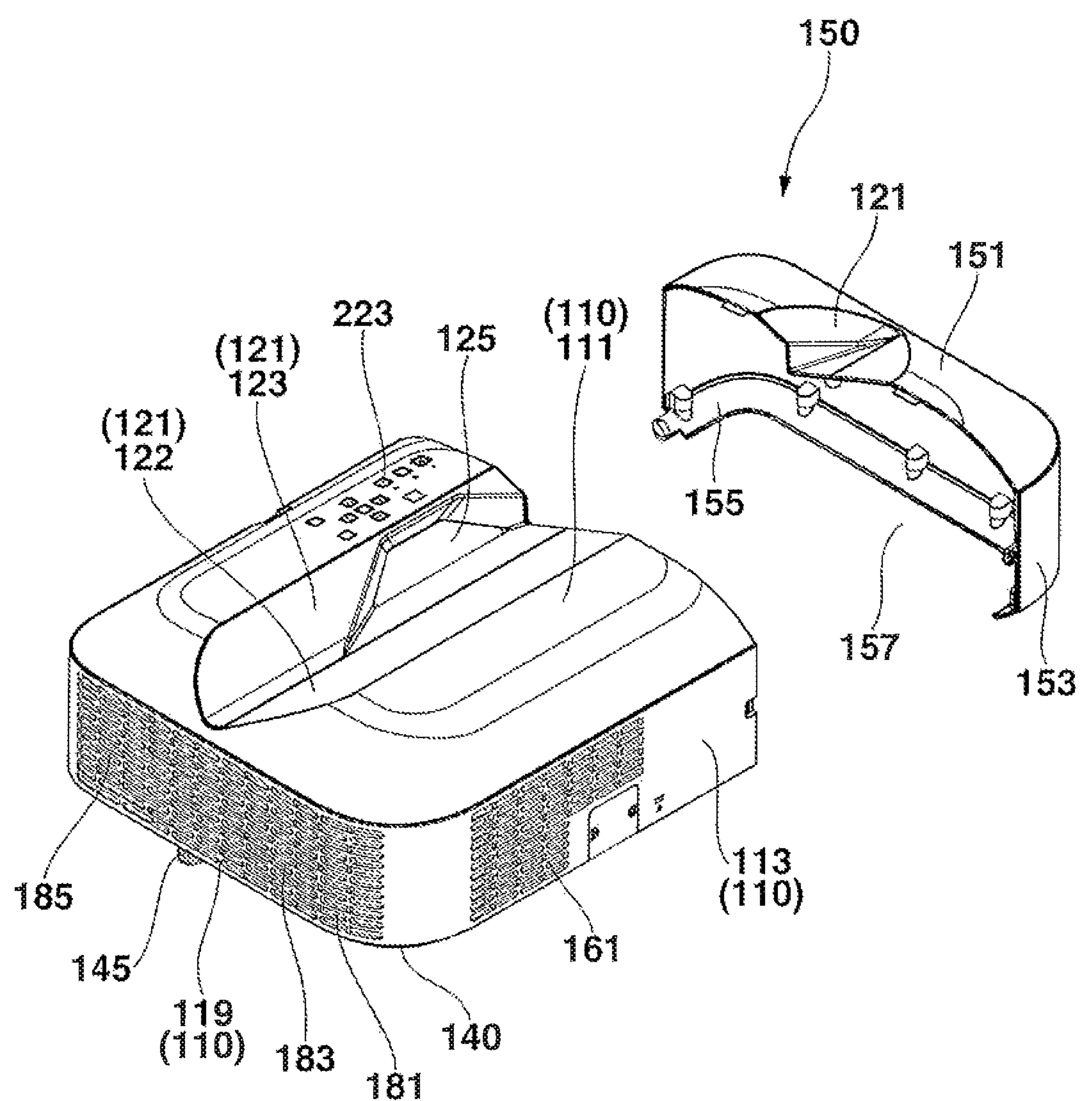
FIG. 2 is an external perspective view of the projector according to the embodiment of the invention with a connector cover removed therefrom.

As shown in FIG. 2, the casing of the projector 100 is made up of a casing main body formed by the upper case 110 and the lowercase 140 and a connector cover 150 which covers a left side panel of the casing main body, and this connector cover 150 can be detachably attached to the casing main body.

In addition, a keys/indicators unit 223 is provided on an upper panel 111 of the upper case. Disposed on this keys/indicators unit 223 are keys and indicators which include a power supply switch key, a projection switch key which switches on and off a projection, a power indicator which informs whether a power supply is on or off, an overheat indicator which informs of the occurrence of an overheat condition in a light source unit, a display device, a control circuit or the like when they really overheat, and the like.

Further, a V-shaped cut groove 121 is formed on the upper panel 111 of the upper case 110. This V-shaped cut groove 121 is formed by a front sloping portion 122 and a rear sloping portion 123 and extends in a left-to-right direction. A projection port 125 is formed in the rear sloping portion 123, so that image light can be emitted obliquely to the front from the projection port 125.

Note that the cut groove 121 is formed so as to extend from the upper panel 111 of the upper case 110 to an upper surface portion 151 of the connector cover 150.

Figure 13:
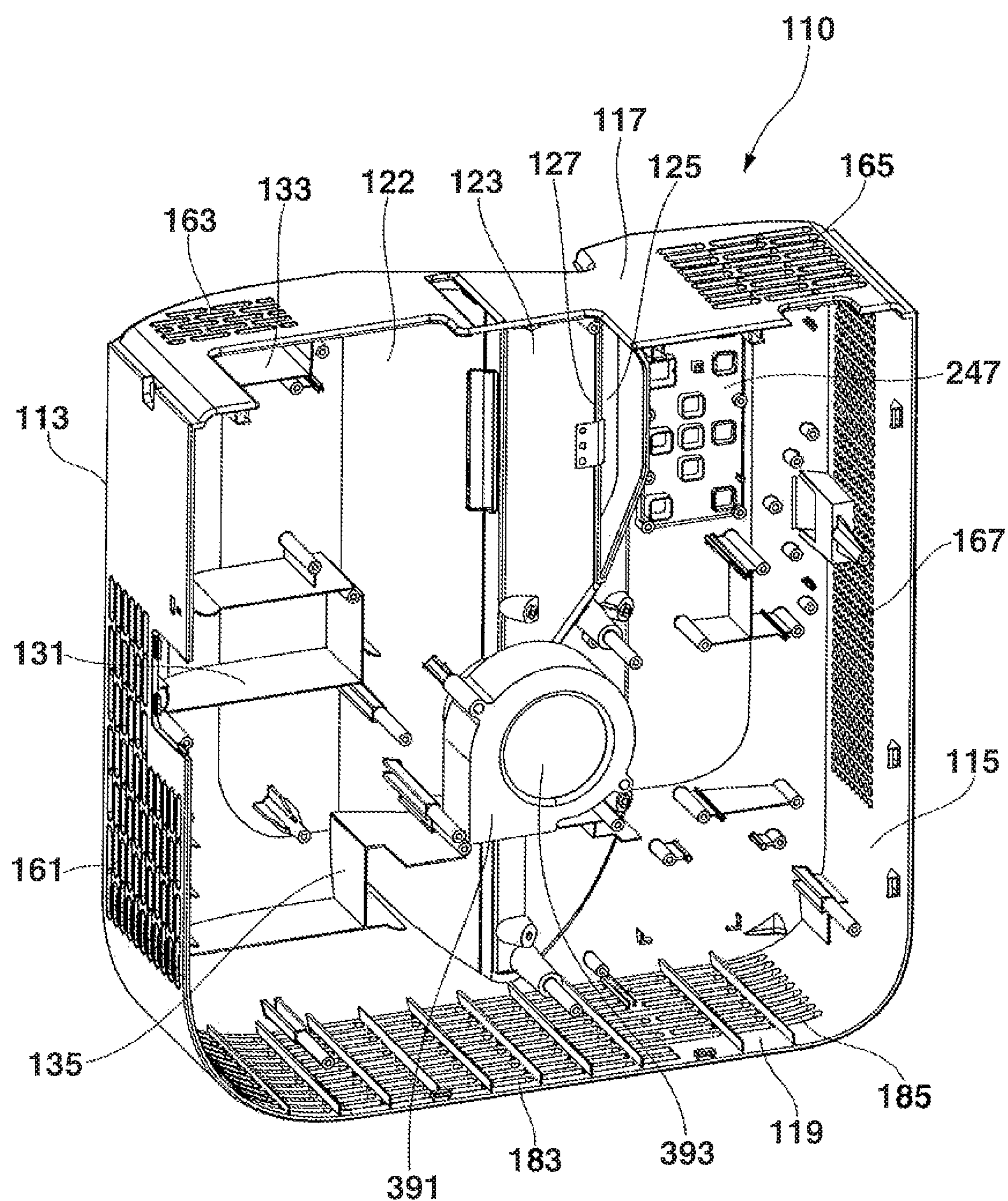
FIG. 13 is a perspective view showing an interior of the upper case of the projector according to the embodiment of the invention.

As shown in FIG. 13, a cushion material 127 is disposed on an inner surface of the projection port 125, and this cushion material 127 has a shape which matches that of the projection port 125. Then, the upper case 110 is placed on the lower case 140 so that the cushion material 127 is brought into abutment with a glass cover which is provided at a case rear portion of a projection unit case which accommodates a projection optical system, which will be described later.

As shown in FIG. 2, the connector cover 150 has an upper surface portion 151, a side surface portion 153 whose front and rear ends are curved into an arc shape, and a lower surface portion 155 which extends along a lower end of the side surface portion 153. A portion inside the lower surface portion 155 is formed into an opening portion 157 so that various connector cables which connect to an input/output connector unit on the left side panel of the upper case 110 can be pulled out from the projector 100 through the opening portion 157.

Figure 3:
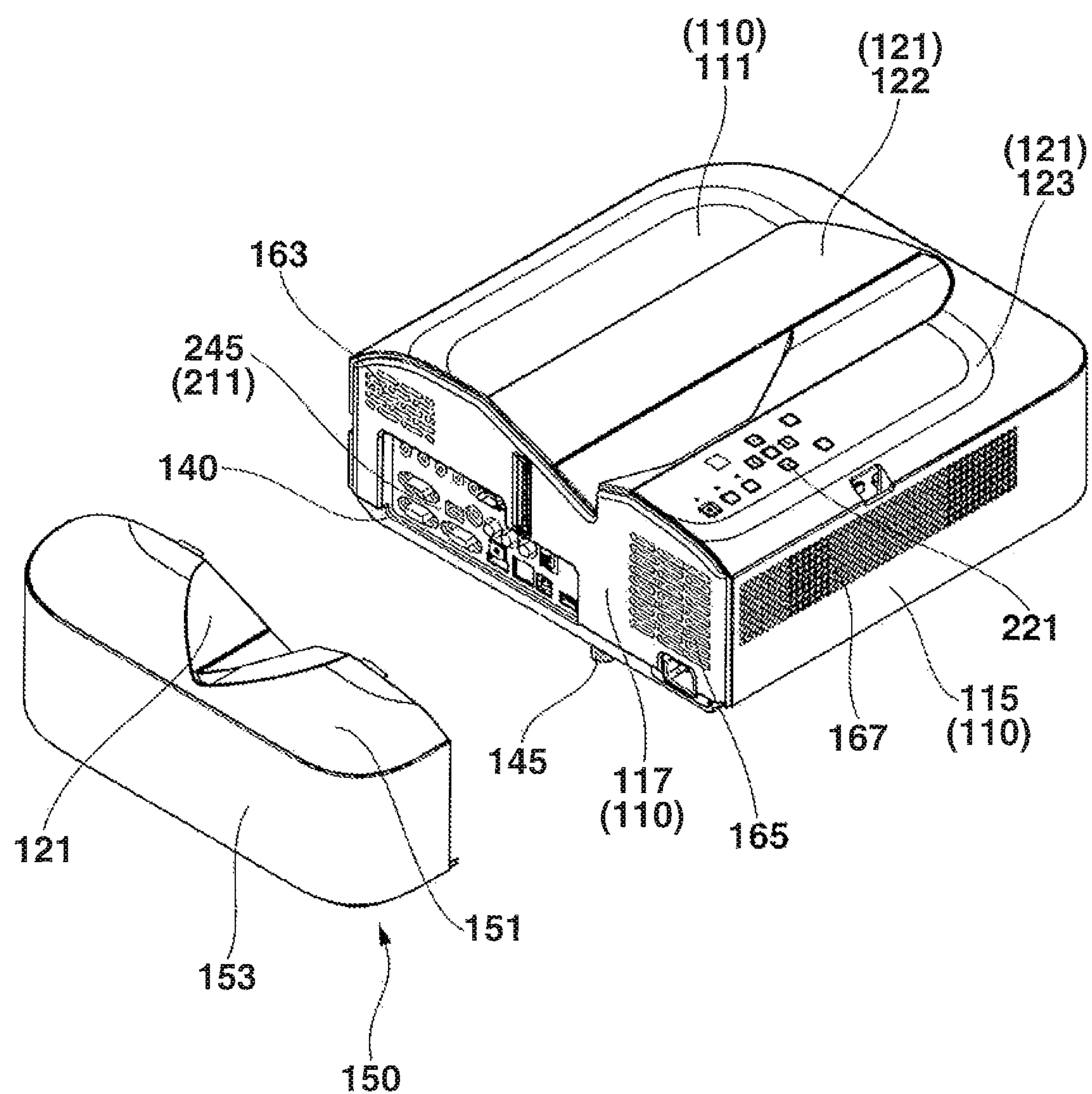
FIG. 3 is an external perspective view, as viewed from the rear, of the projector according to the embodiment of the invention with the connector cover removed therefrom.

In addition, as shown in FIG. 3, on the left side panel 117 of the upper case 110, a connector board 245 is provided. The connector board 245 has the input/output connector unit 211, and a group of various terminals is provided in the input/output connector unit 211, including an SB (serial bus) terminal, a video signal input D-SUB terminal into which analog RGB video signals are inputted, an S terminal, an RCA terminal, a voice output terminal, a power supply adapter and plugs.

Further, a side surface front outside are inlet port 163 is provided at a front of the left side panel 117 and above the input/output connector unit 211, and a side surface rear outside air inlet port 165 is provided at a rear of the left side panel 117.

A back surface side outside air inlet port 167 is also provided on a back plate 115 of the upper case 110, and part of the back surface inlet port 167 which is located at a portion lying near a right end doubles as a sound emitting hole of a loud speaker.

Figure 4:
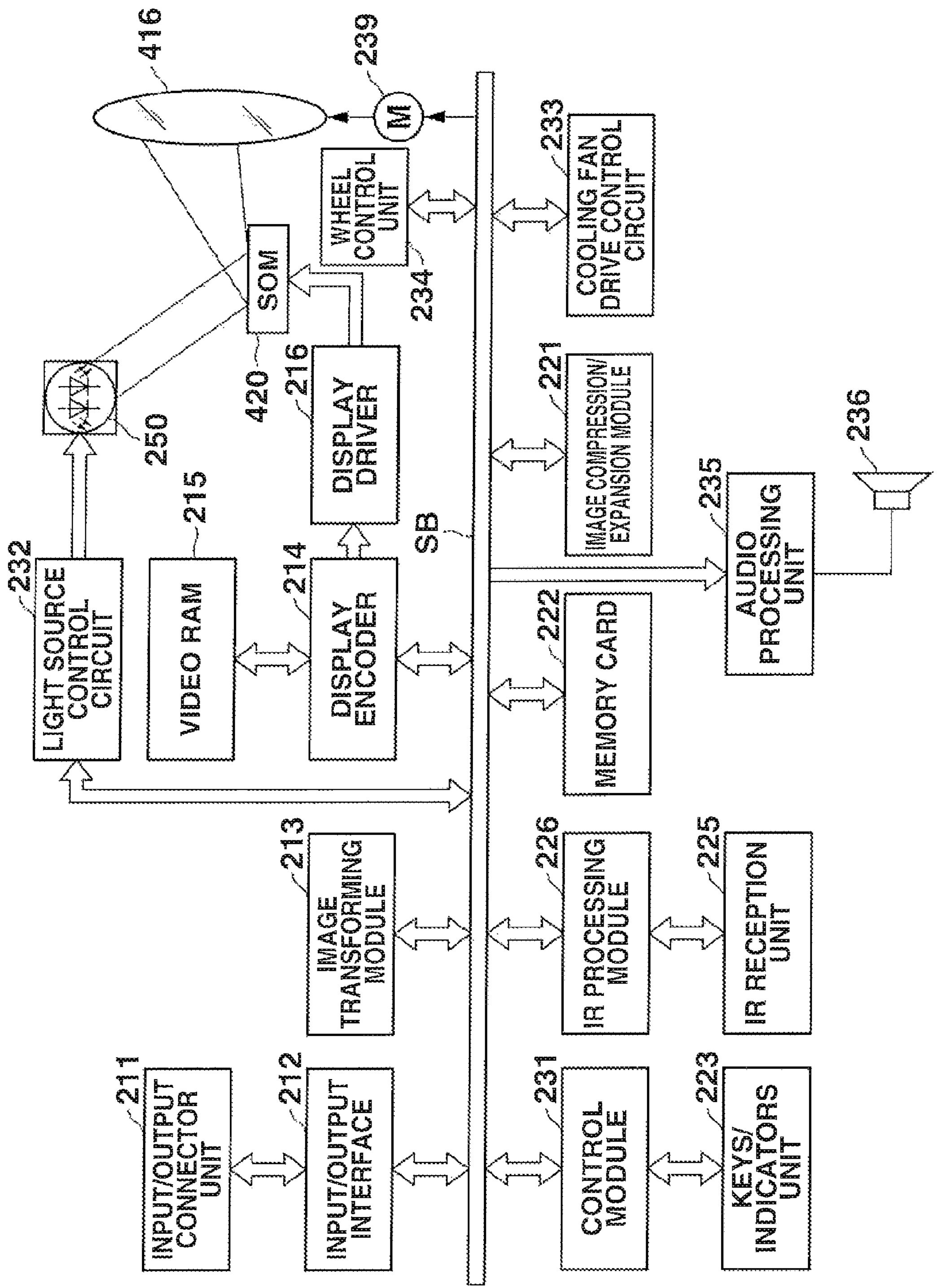
FIG. 4 is a functional block diagram of the projector according to the embodiment of the invention.

Next, a projector control unit of the projector 100 will be described by the use of a functional block diagram shown in FIG. 4.

The projector control unit includes a control module 231, an input/output interface 212, an image transforming module 213, a display encoder 214, a display driver 216 and the like.

Image signals of various standards which are inputted from the input/output connector unit 211 are sent via the input/output interface 212 and a system bus (SB) to the image transforming module 213 where the image signals are transformed so as to be unified into an image signal of a predetermined format which is suitable for display by the projector control unit. Thereafter, the image signals so transformed are outputted to the display encoder 214.

This control module 231 governs the control of operations of circuitries within the projector 100 and is made up of a CPU, which is an arithmetic operation device, a ROM which stores in a fixed fashion operation programs of various types of settings, a RAM which is used as a working memory, and the like.

The display encoder 214 deploys the image signals that have been inputted thereinto on a video RAM 215 for storage therein and generates a video signal from the contents stored in the video RAM 215, outputting the video signal so generated to the display driver 216.

The display driver 216 functions as a display device control module and drives a display device 420, which is a spatial optical modulator (SOM), at an appropriate frame rate in response to the image signal outputted from the display encoder 214.

The projector 100 includes a light source unit 250 which includes an excitation light shining device 310 having an excitation light source and the like, a luminescent light emitting luminescent material device 331, a red light source device 350, a main light source module 330 having a light guiding optical system 370, and a light source side optical device 380 having a light tunnel 383 and the like.

In this projector 100, a pencil of light which is emitted from the main light source module 330 of the light source unit 250 is shone on to the display device 420 via the light source side optical system 380 of the light source unit 250, whereby an optical image is formed by using reflected light reflected by the display device 420. The image so formed is then projected on to, for example, a wall surface as shown in FIG. 14 for display thereon via a projection optical system, which will be described later.

A movable lens group 416 of the projection optical system is driven by a lens motor 239 for zooming or focusing.

When in a reproducing mode, an image compression/expansion module 221 reads out the image data recorded on a memory card 222 and expands individual image data that make up a series of dynamic images frame by frame. Then, the image compression/expansion module 221 outputs the image data to the display encoder 214 via the image transforming module 213 so as to enable the display of dynamic images and the like based on the image data stored on the memory card 222.

Operation signals from the keys/indicators unit 223 provided on the upper case 110 of the casing are sent out directly to the control module 231. Key operation signals from a remote controller are received by an IR reception unit 225, and cord signals are demodulated by an Ir processing module 226 to be outputted to the control module 231.

An audio processing unit 235 is connected to the control module 231 via the system bus (SB). This audio processing module 235 includes a circuitry for a sound source such as a PCM sound source. When in a projection mode and a reproducing mode, the audio processing unit 235 converts audio data into analog signals and drives a loud speaker 236 to output loudly sound or voice based on the audio data.

The control module 231 controls a light source control circuit 232 which is configured as alight source control module. This light source control circuit 232 controls separately and individually the emission of lights in the red, green and blue wavelength ranges from the excitation light shining device (the excitation light source) 310 and the red light source device 350 of the light source unit 250 and controls a rotation of a luminescent material wheel of the luminescent light emitting luminescent material device 331 via a wheel control unit 234 so that the lights in the predetermined wavelength ranges which are required when an image is generated are emitted from the main light source module 330 of the light source unit 250.

Further, the control module 231 causes a cooling fan drive control circuit 233 to detect temperatures through a plurality of temperature sensors which are provided in the light source unit 250 and the like so as to control the rotating speeds of cooling fans based on the results of the temperature detections.

The control module 231 also controls the cooling fan drive control circuit 233 so that the cooling fans continue to rotate even after the power supply to the projector main body is turned off through a timer or the power supply to the projector main body is turned off depending upon the results of the temperature detections by the temperature sensors.

Figure 5:
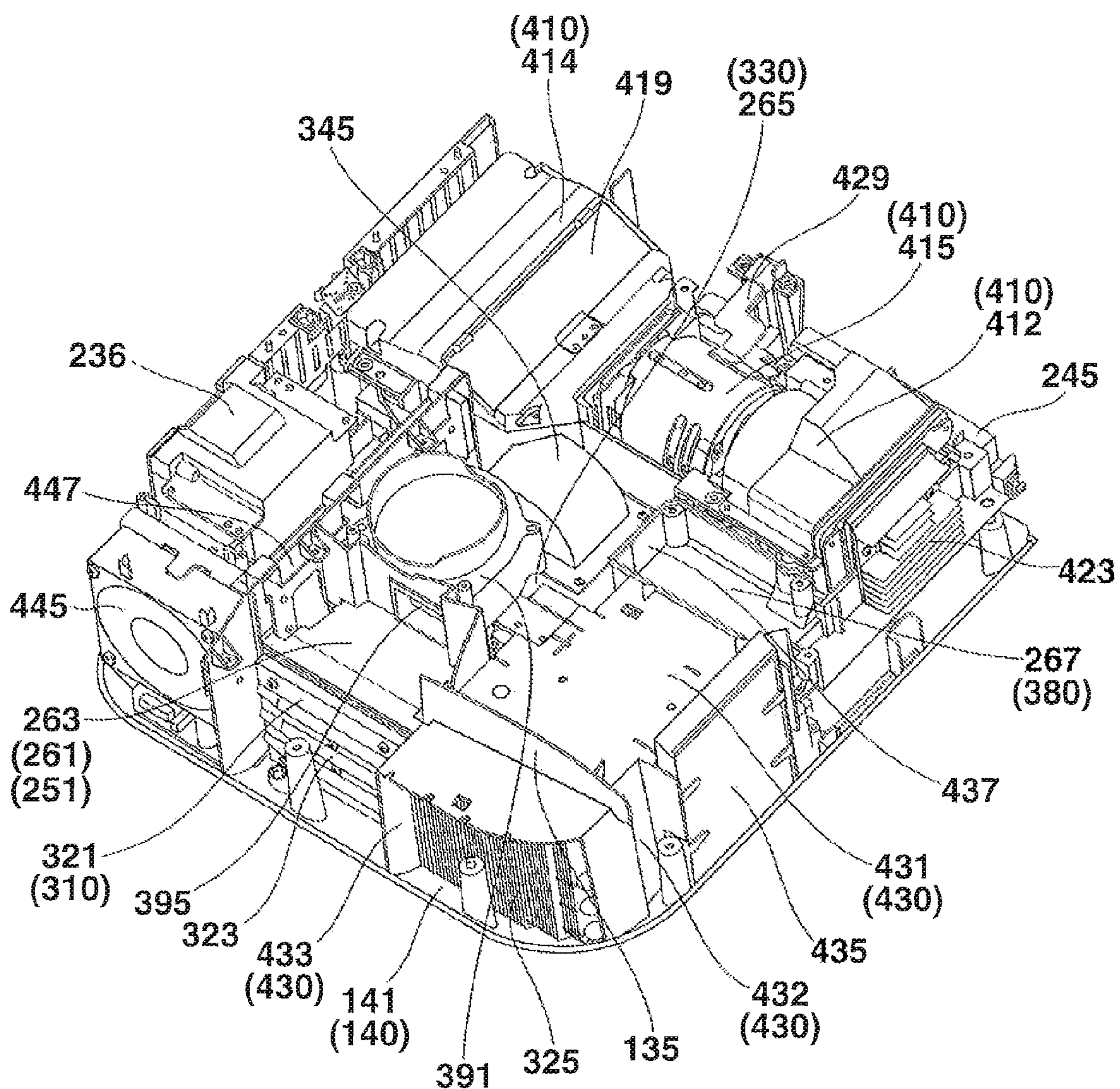
FIG. 5 is a perspective view showing an example of an internal construction of the projector according to the embodiment of the invention with an upper case removed therefrom.
Figure 6:
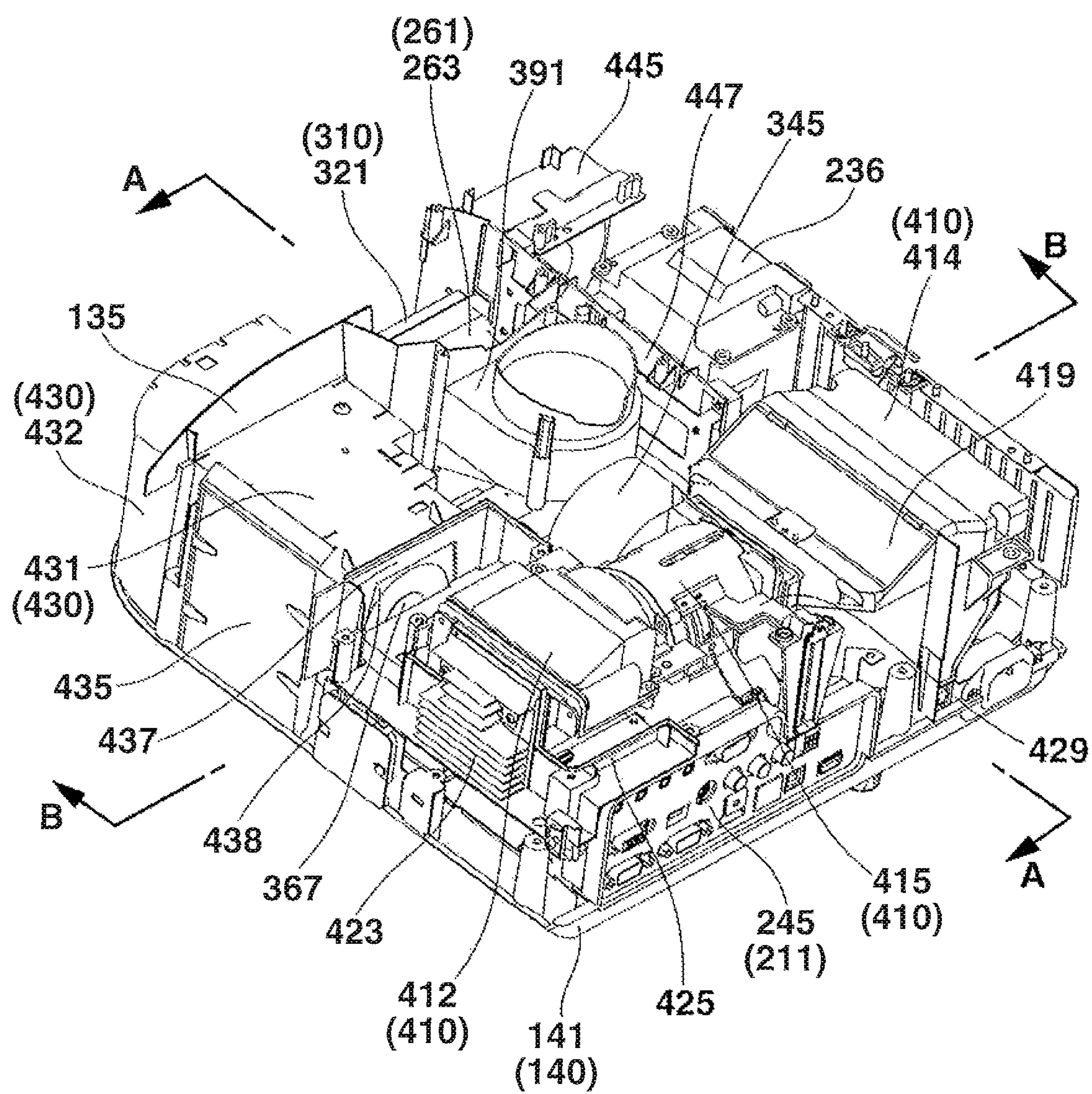
FIG. 6 is a perspective view, as viewed from a different angle, showing the example of the internal construction of the projector according to the embodiment of the invention with the upper case removed therefrom.
Figure 7:
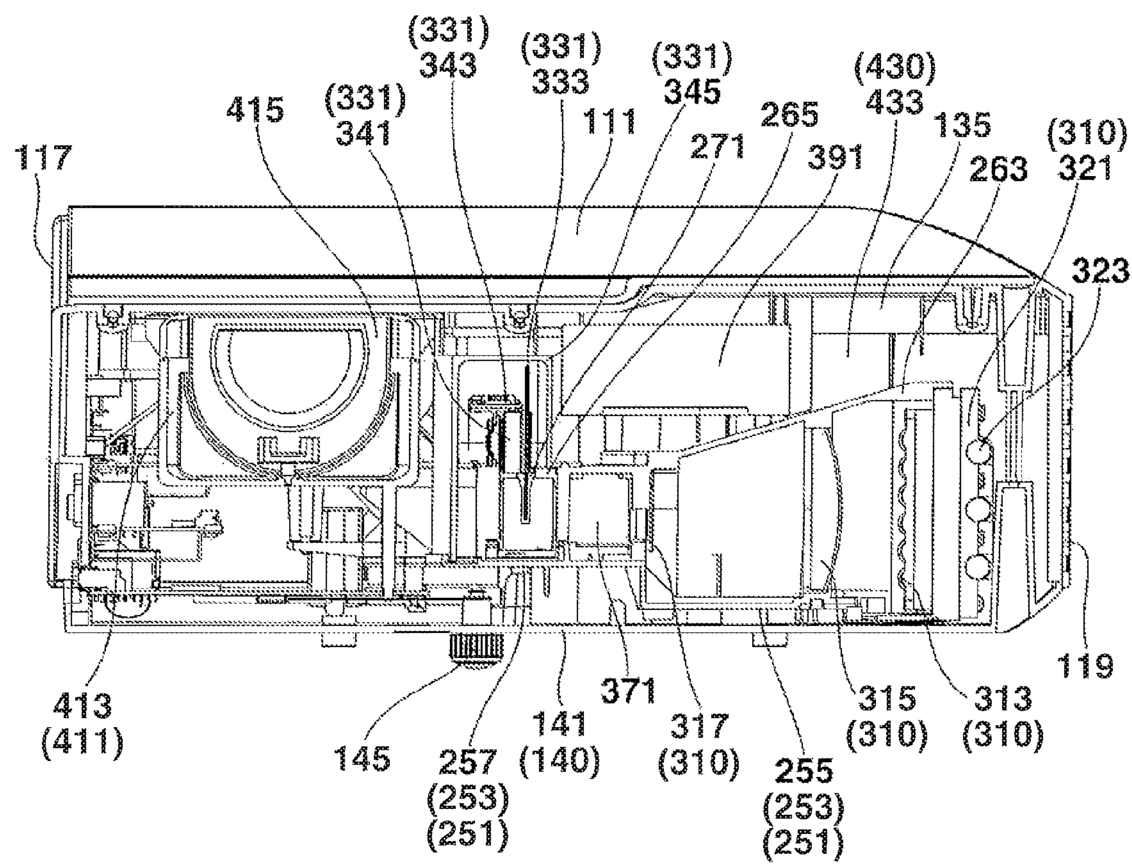
FIG. 7 is a sectional view of the projector according to the embodiment of the invention taken along a line A-A in FIG. 6.
Figure 8:
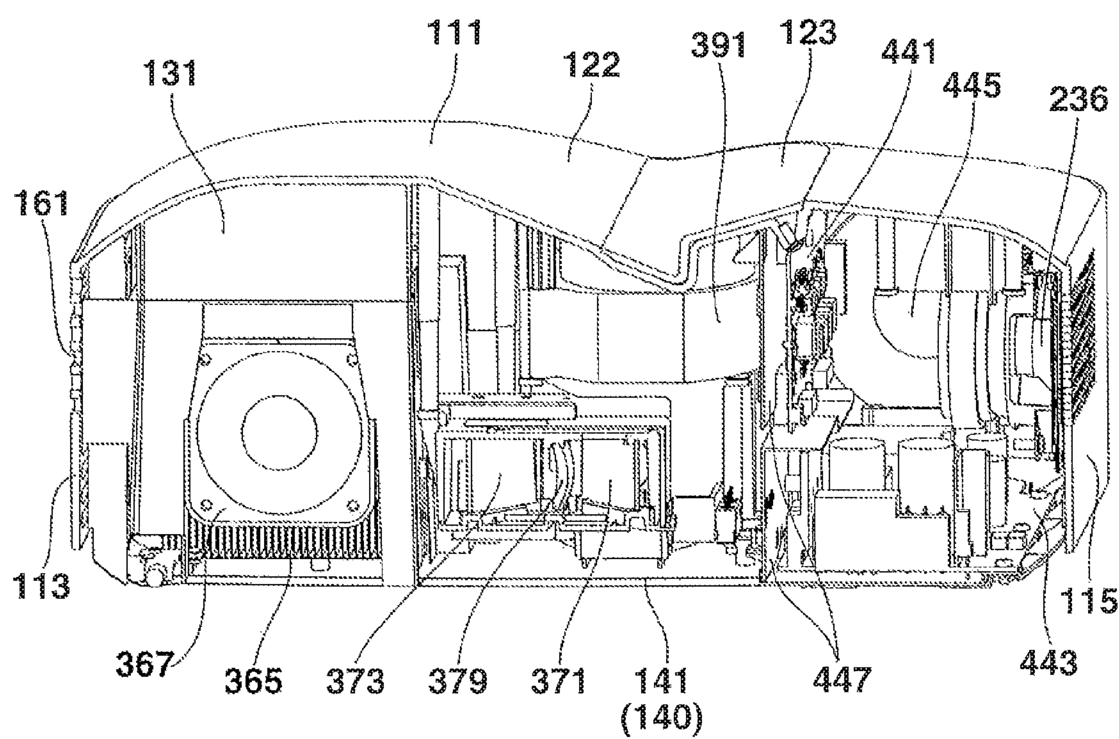
FIG. 8 is a sectional view of the projector according to the embodiment of the invention taken along a line B-B in FIG. 6.
Figure 9:
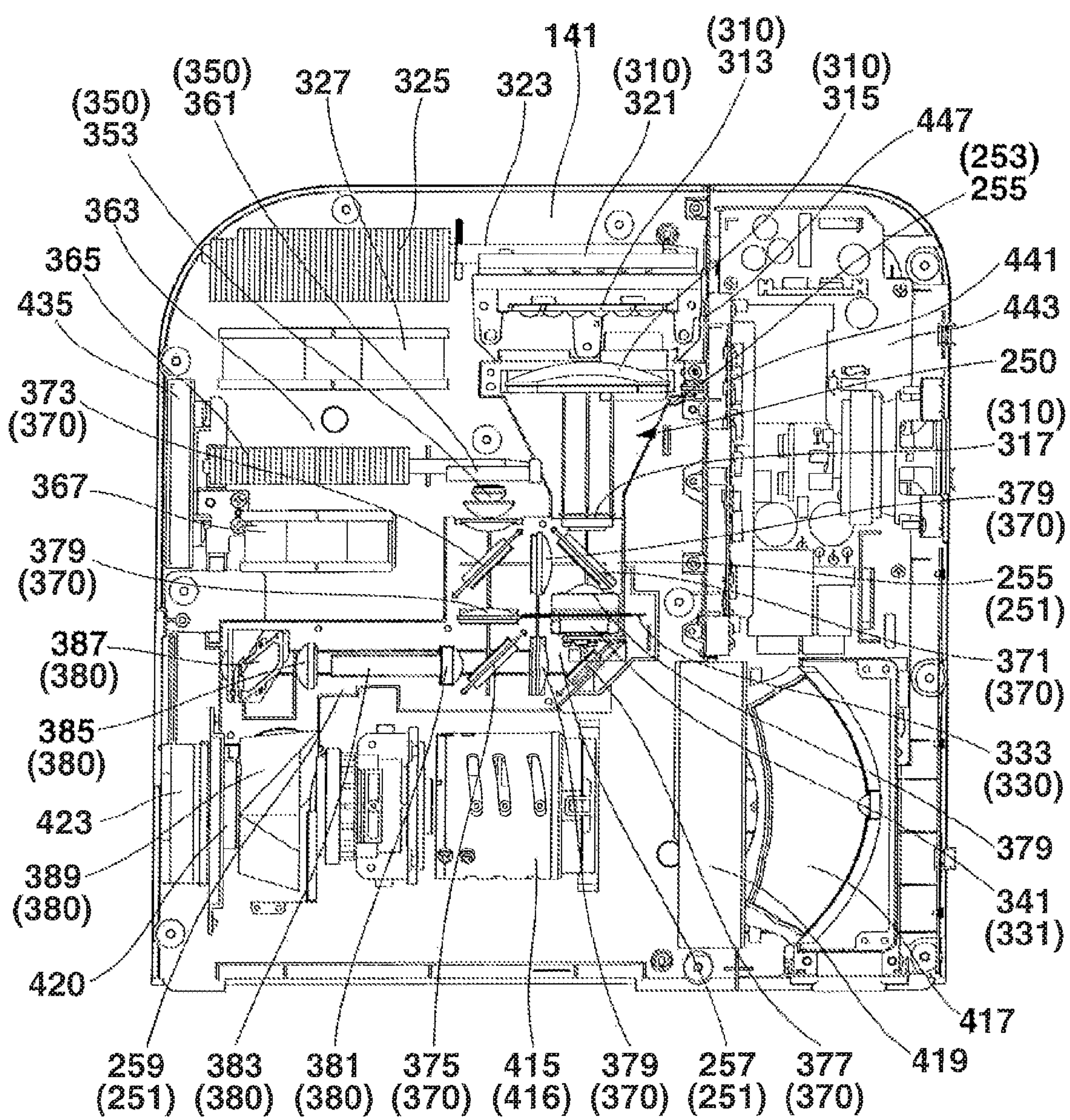
FIG. 9 is a schematic view of the internal construction of the projector according to the embodiment of the invention, showing around an optical system of the projector in detail.

Next, an internal construction of the projector 100 will be described. FIGS. 5 and 6 are perspective views showing the internal construction of the projector 100, and FIGS. 7 and 8 are sectional views of the projector 100 with the upper case 110 placed thereon taken along lines A-A and B-B in FIG. 6. FIG. 9 is a schematic view of the internal construction which illustrates around the optical system of the projector in detail.

In FIG. 5, a direction towards a right lower indicates a direction towards a front of the projector 100, and in FIG. 6, a direction towards a left lower indicates a direction towards a front of the projector 100.

This projector 100 which is an image projection system includes, in an interior of a heat sink cover 430 which is provided at a right front corner portion of the bottom panel 141 shown in FIGS. 5 and 6, an excitation light source heat sink 325 shown in FIG. 5 which is made up of heat dissipating fins for cooling an excitation light source, a red light source heat sink 365 shown in FIG. 9 which is made up of heat dissipating fins for cooling a red light source, a first cooling fan 327, and a second cooling fan 367.

The excitation light shining device 310, which is accommodated in the light source unit 250, is disposed at a central portion at a right end of the bottom panel 141 which lies at the rear of the excitation light source heat sink 325. An excitation light source top panel portion 263 of a unit cover 261 which covers the excitation light shining device 310 is disposed lower than a cover upper panel 431 of the heat sink cover 430.

Further, a control module cooling fan 445, which is an axial flow blower, is disposed at the rear of the excitation light shining device 310.

The main light source module 330 of the light source unit 250 is disposed substantially at a center of the bottom panel 141, and a wheel cover 345 projects upwards from the main light source module 330. A blower 391, which is a sirocco fan, is disposed on a right-hand side of the wheel cover 345.

This blower 391 is disposed just above the unit cover 261 which lies above a middle position between the excitation light shining device 310 and the wheel cover 345. A discharge port 395 of the blower 391 is directed rightwards to send air above the excitation light shining device 310. The blower 391 includes a discharge port partition panel 135 which extends in a front-to-rear direction.

The blower 391 and the discharge port partition panel 135 are attached to an inner side of the upper panel 111 of the upper case 110, as will be described later.

Further, the light source side optical device 380, which will be described below is disposed at a center of a front side of the bottom panel 141 which lies on a left-hand side of the heat sink cover 430. An optical device top panel portion 267 of the unit cover 261, which covers the light source side optical device 380, is disposed lower than the cover upper panel 431 of the heat sink cover 430.

A projection optical system unit 410 is disposed on a left-hand side of the light source side optical device 380 and the main light source module 330 of the light source unit 250.

This projection optical system unit 410 includes a digital micromirror device, which is called a DMD, at the front thereof as the display device 420 (refer to FIG. 9). A projection optical system lens group is incorporated in a lens barrel 415 which is disposed at the rear of the display device 420, and this projection optical system lens group is made up of a fixed lens group and a movable lens group 416. A case rear portion 414 of a projection unit case 411 (refer to FIGS. 7, 11) which accommodates an aspheric mirror (a back projection mirror) is disposed at the rear of the lens barrel 415 and constitutes a proximity projection optical system.

A heat dissipating fin 423 for cooling the display device 420 is provided at a front end of the projection optical system unit 410 which is a back surface side of the display device 420. Image light reflected by the aspheric mirror is emitted obliquely to the front from the projection port 125 in the upper case 110 via a glass cover 419.

An adjustment lever 429 for fine manual focus adjustment is provided on a left-hand side of the projection optical system unit 410, and further, the connector board 245 is provided on a left-hand side of the projection optical system unit 410 and at the same place where the input/output connector unit 211 is provided.

As shown in FIG. 6, a partition rib 425 is provided on an upper surface of the connector board 245. This partition rib 425 extends to the right by a distance corresponding to a thickness of the connector board 245 from a substantially central position of a left side panel 117 side of the connector board 245, then to the front along the connector board 245 and to the right from near a front end of the connector board 245 to reach a left end of the heat dissipating fin 423 which is the front end of the projection optical system unit 410. Thus, the partition board 425 has a crank shape.

The heat sink cover 430 has the panel-shaped cover upper panel 431 which covers the excitation light source heat sink 325, the red light source heat sink 365 and the cooling fan and a cover front wall portion 432 which is suspended downwards from a right-hand side of a front end of the cover upper panel 431. A left-hand side of the cover front wall portion 432 is opened, and a filter 435 is provided therein.

As shown in FIG. 5, the heat sink cover 430 has a cover rear wall portion 433 at the rear of the cover upper panel 431. This cover rear wall portion 433 is suspended downwards from the whole of a rear end of the cover upper panel 431 to constitute a bulkhead.

As shown in FIG. 6, a lower bulkhead 437 including a ventilation hole 438 is provided on a left-hand side of the cover upper panel 431, and a left-hand side of the heat sink cover 430 is closed by the lower bulkhead 437.

The lower bulkhead 437 has a U-like shape and covers a space above the light source side optical device 380.

A panel-shaped partition panel 447 is provided at the rear of the excitation light shining device 310 and the main light source module 330 so as to extend horizontally laterally.

The loud speaker 236 is disposed to the left of the control module cooling fan 445 at the rear of the partition panel 447. Various circuit boards such as a main control circuit board 441 on which the CPU and a memory are mounted, a power supply control circuit board 443 and a circuit board which incorporates a light source control circuit 232 (refer to FIG. 4) are disposed on a rear surface of the partition panel 447 and the upper surface of the bottom panel 141 of the lower case 140 (refer to FIG. 8).

As shown in FIG. 7, in the optical system of the projector 100 which is an image projection system, the excitation light shining device 310 is disposed on an excitation light source bottom panel portion 255 of a unit bottom panel 253 of the light source unit 250. The excitation light source bottom panel portion 255 is positioned near the right end of the bottom panel 141 of the lower case 140.

The excitation light shining device 310 has excitation light sources, collimator lenses 313, a collective lens 315 and a diffusing plate 317. Then, 32 blue laser emitters which are semiconductor light emitting devices are disposed on a device holder 321 as excitation light sources. Laser beams from the blue laser emitters are converted into substantially parallel pencils of light by the collimator lenses 313 to be incident on the collective lens 315.

The device holder 321 holds four blue laser emitters as excitation light sources at a first stage, six blue laser emitters at each of second to fifth stages, and four blue laser emitters at a sixth stage. Namely, the device holder 321 is formed into a matrix of six rows and six columns, and the excitation light sources are disposed at 32 locations excluding both end locations at an uppermost stage and a lowermost stage as a first light source.

All the laser beams which are collected by the collective lens 315 are incident on the diffusing plate 317, and the coherent properties of laser beams are reduced by the diffusing plate 317.

The laser beams which have passed through the diffusing plate 317 are incident on a luminescent material wheel 333 of the main light source module 330.

This main light source module 330 includes the luminescent material wheel 333, functioning as the luminescent light emitting luminescent material device 331, which is driven to rotate by a wheel motor 341, the red light source device 350 and the light guiding optical system 370, which are disposed on a main light source bottom panel portion 257 of the unit bottom panel 253.

Figure 10:
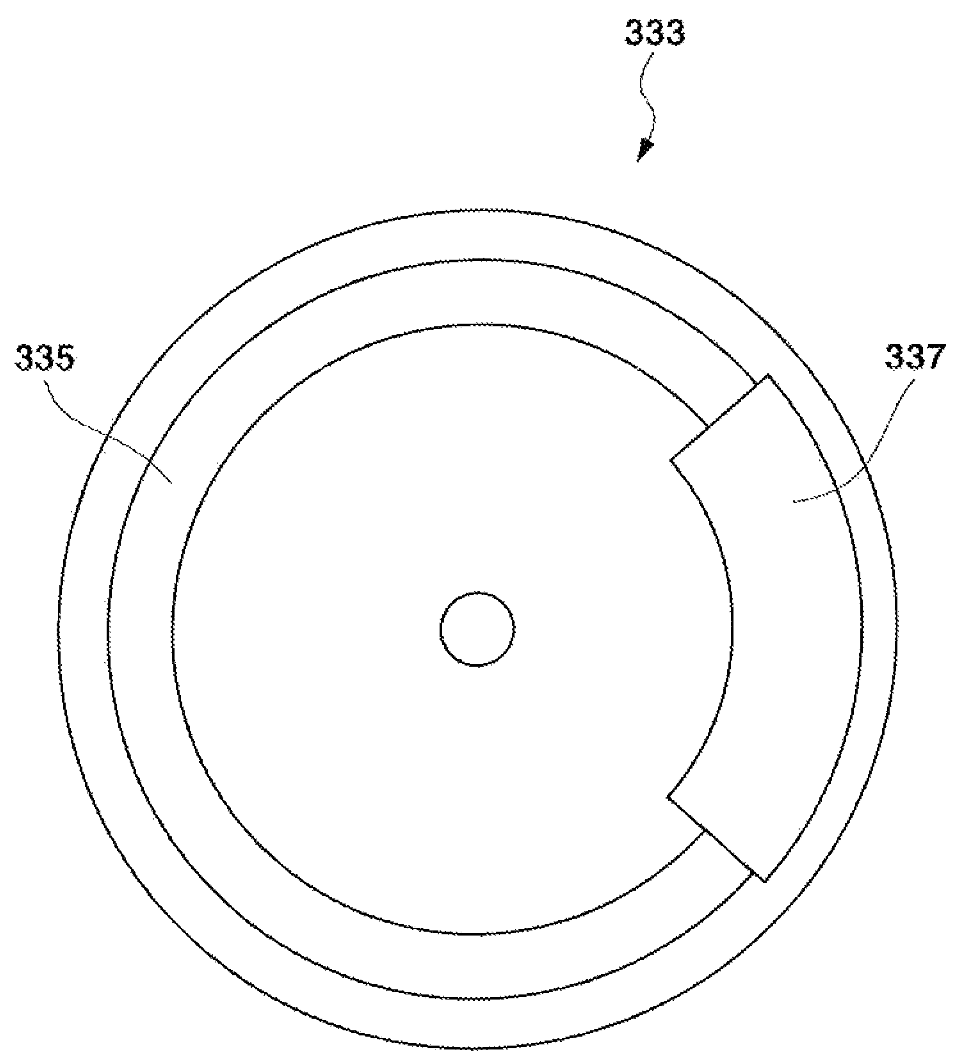
FIG. 10 is a front view of a luminescent wheel in a luminescent light emitting device according to the embodiment of the invention.

As shown in FIG. 10, the luminescent material wheel 333 has a diffuse transmission area 337 and a luminescent material area 335 on a circumference thereof. The diffuse transmission area 337 is such that a transparent base material having light transmitting properties such as glass is fitted in a cut through hole portion cut in a rotational plate base material. Fine irregularities are formed on a front surface of the transparent base material through sandblasting. Thus, the transparent base material constitutes a plate member which transmits light while diffusing it.

In the luminescent material area 335, an annular groove is formed on a front surface of the rotational plate base material which is a metallic base material made of copper, aluminum or the like. A bottom portion of the groove is mirror finished through silver deposition or the like, and a green luminescent material layer is laid out on the mirror finished front surface to thereby form the luminescent material area 335.

The wheel motor 341, as will be described belw, is fixed to an upper surface of a main light source top panel portion 265 (refer to FIG. 7). A rotational shaft of the luminescent material wheel 333 is positioned above an axis of excitation light which has passed through the collective lens 315 and the diffusing plate 317. Thus, the wheel motor 341 is disposed so that the axis of the excitation light and the rotational shaft are parallel to each other.

The red light source device 350 is a monochromatic light emitting device which includes a red light emitting diode which is a semiconductor light emitting device which is disposed so that an optical axis thereof becomes parallel the axis of excitation light from the excitation light shining device 310 and a collective lens group 353 which collects light emitted from the red light emitting diode which constitutes a second light source (refer to FIG. 9).

The light guiding optical system 370 is made up of dichroic mirrors and collective lenses. Namely, the light guiding optical system 370 includes a first dichroic mirror 371 which is disposed between the diffusing plate 317 of the excitation light shining device 310 and the luminescent material wheel 333, a second dichroic mirror 373 which is disposed at the front of the first dichroic mirror 371 and in a position on an axis of light emitted from the red light source device 350, a reflecting mirror 377 which is disposed on a left-hand side of the luminescent material wheel 333, a third dichroic mirror 375 which is disposed at the front of the reflecting mirror 377 and on a left-hand side of the second dichroic mirror 373 and collective lenses 379 which are disposed between the dichroic mirrors and between the reflecting mirror 377 and the dichroic mirrors.

The first dichroic mirror 371 transmits light in the blue wavelength range and reflects light in the green wavelength range. Consequently, the first dichroic mirror 371 transmits excitation light from the excitation light shining device 310 so as to be shone on to the luminescent material wheel 333 and reflects luminescent light from the luminescent material wheel 333 towards the front of the projector 100.

The second dichroic mirror 373 transmits light in the red wavelength range and reflects light in the green wavelength range. Consequently, the second dichroic mirror 373 reflects light in the green wavelength range which is reflected by the first dichroic mirror 371 and which has passed through the collective lens 379 to the left of the projector 100 and transmits light in the red wavelength range emitted from the red light source device 350 so that an axis of the light in the red wavelength range coincides with an axis of the light in the green wavelength range reflected by the second dichroic mirror 373.

The reflecting mirror 377 reflects light in the blue wavelength range which is excitation light from the excitation light shining device 310 and which has passed through the diffuse transmission area 337 of the luminescent material wheel 333 to the front of the projector 100.

The third dichroic mirror 375 transmits light in the blue wavelength range and reflects light in the green wavelength range and light in the red wavelength range. Consequently, the third dichroic mirror 375 transmits light in the blue wavelength range from the reflecting mirror 377 and reflects light in the red wavelength range which is transmitted through the second dichroic mirror 373 and light in the green wavelength range which is reflected by the second dichroic mirror 373 so that axes of light in the blue wavelength range, light in the green wavelength range and light in the red wavelength range coincide with one another to be emitted to the light source side optical device 380 which is disposed to the front of the third dichroic mirror 375.

This light source side optical device 380 uniforms light source light and guides it to the display device 420 of the projection optical system unit 410. The light source side optical device 380 includes collective lenses 381, 385, a light tunnel 383 and a light axis direction changing mirror 387 which are disposed on an optical system device bottom panel portion 259 of the unit bottom panel 253 of the light source unit 250.

The light source side optical device 380 causes light source light which has been emitted from the main light source module 330 and passed through the third dichroic mirror 375 to be collected by the collective lens 381 to be incident on the light tunnel 383 so that the light source light is uniformed. Further, the uniformed light which is emitted from the light tunnel 383 is collected by the collective lens 385 to be shone on to the light axis direction changing mirror 387. Then, the light reflected by the light axis direction changing mirror 387 is caused to be incident on the projection optical system unit 410 via a connection tube 275 (refer to FIG. 12).

This light axis direction changing mirror 387 changes the direction of an axis of light emitted from the light tunnel 383 by 90 degrees to the left so that the light becomes parallel to the display device 420 and the front panel 113 and reflects the light obliquely upwards at an angle of 45 degrees.

In this way, the traveling direction of the light source light is changed by the light axis direction changing mirror 387 so that the light source light travels parallel to an incident surface of the display device 420. Then, the light source light is incident on a TIR prism 389 which is disposed nearest to a front surface of the display device 420 to be shone on to an image forming surface of the display device 420. This enables a front end of the light source side optical device 380 to be substantially aligned with the front end of the projection optical system unit 410 by disposing the light axis direction changing mirror 387 close to the display device 420 and the TIR prism 389.

The projection optical system unit 410 has the TIR prism 389 disposed nearest to the front surface of the display device 420, and when light from the light axis direction changing mirror 387 is incident on the TIR prism 389, the TIR prism 389 allows the incident light to be then shone on to the display device 420. Then, image light formed by the display device 420 is shone on to an aspheric mirror 417 which is positioned at the rear of the projector 100 via the fixed lens group and the movable lens group 416 incorporated in the lens barrel 415 which is positioned further rearwards of the projector 100 than the display device 420.

The image light which is reflected by the aspheric mirror 417 is emitted from the projection optical system unit 410 via the glass cover 419 which is attached to the projection unit case 411 and is then projected on to a screen or the like through the projection port 125 formed in the upper case 110 which is disposed nearest to the glass cover 419 via the cushion material 127.

Figure 11:
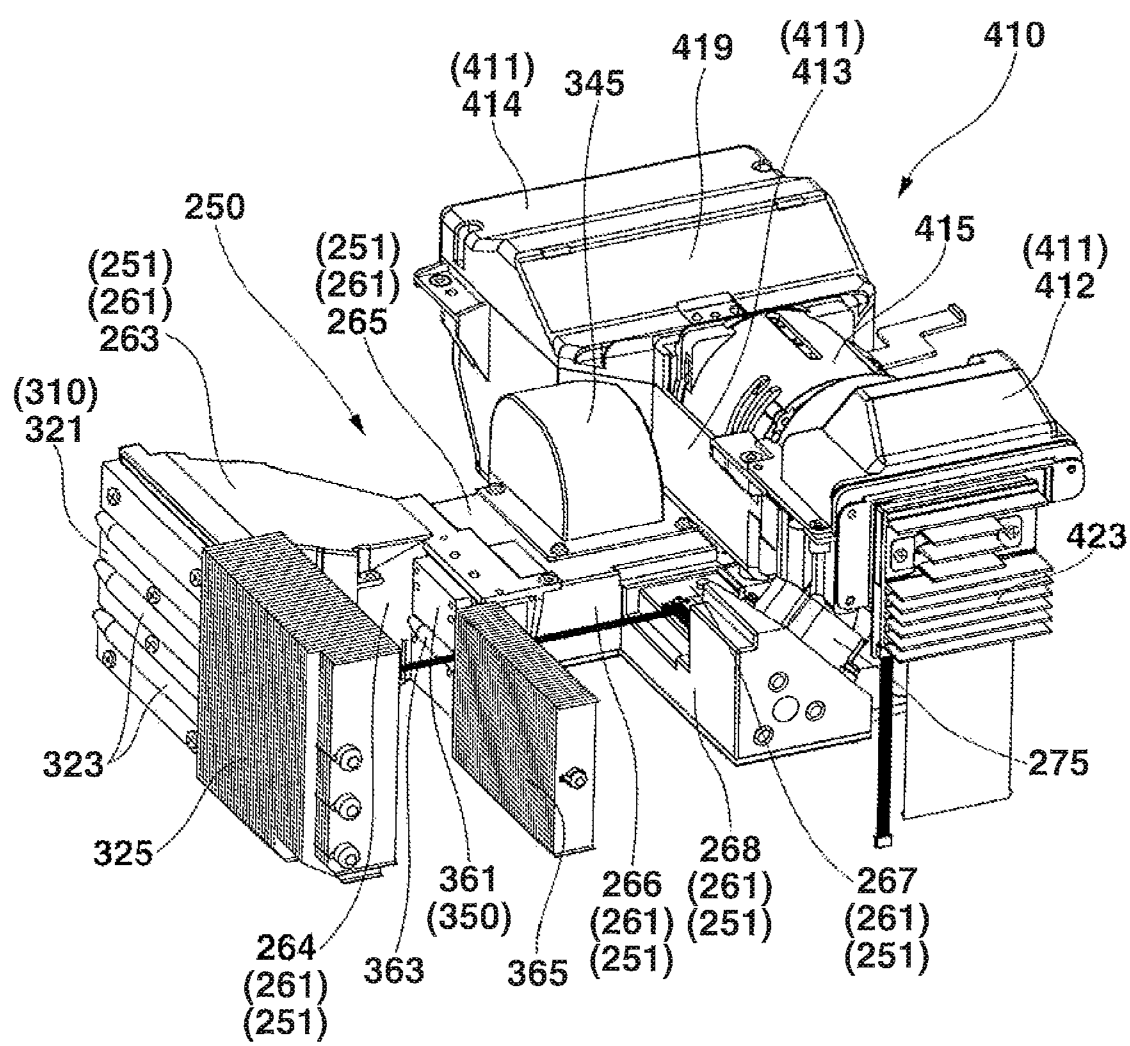
FIG. 11 is a perspective view showing a light source unit and a projection optical system unit according to the embodiment of the invention.
Figure 12:
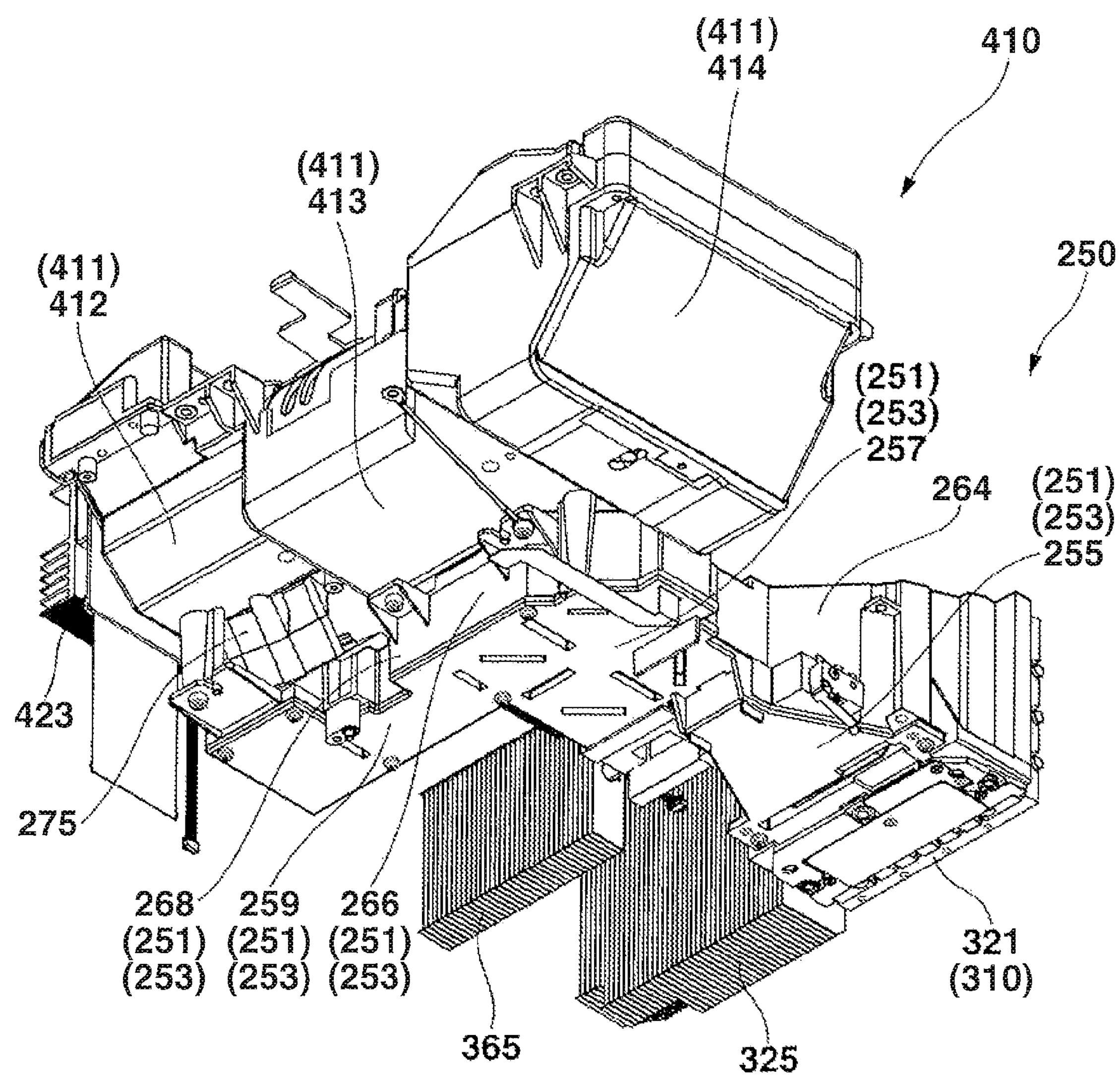
FIG. 12 is a perspective view showing the light source unit and the projection optical system unit according to the embodiment of the invention as viewed from a lower surface side thereof.

The light source unit 250, including the excitation light shining device 310 having the excitation light sources which is the first light source, the red light source device 350 having the red light source which is the second light source, the light guiding optical system 370 and the light source side optical device 380, is accommodated in the light source unit case 251 which includes the wheel cover 345, as shown in FIGS. 11 and 12.

Additionally, the projection optical system unit 410, including the TIR prism 389, the display device 420, and the lens group and the aspheric mirror 417 of the projection optical system is also accommodated in the projection unit case 411.

Further, the light source unit case 251 which accommodates the light source unit 250 and the projection unit case 411 which accommodates the projection optical system unit 410 are connected together to constitute an optical apparatus for the projector 100.

The tubular connection tube 275 is provided at a portion on a side of the projection unit case 411 to which the display device 420 of the projection optical system unit 410 is fixed which lies near a front end of the projection unit case 411 so as to extend obliquely downwards to thereby connect an interior space of the light source unit case 251 with an interior of the projection unit case 411.

The light source unit case 251 is made up of the unit bottom panel 253 which is made of a heat-resistant resin, the unit cover 261 which is made of a light metal alloy such as a magnesium alloy and the wheel cover 345.

As shown in FIG. 12, an end portion of the excitation light source bottom panel portion 255 of the unit bottom panel 253 is connected to a lower end of the device holder 321 of the excitation light shining device 310. Additionally, as shown in FIG. 11, end portions of the excitation light source top panel portion 263 and an excitation light source side panel portion 264 of the unit cover 261 are connected to an upper end and a side portion of the device holder 321 of the excitation light shining device 310, respectively.

In this way, in the light source unit case 251, an end portion of the light source unit 250 which lies to face the excitation light shining device 310 is closed by the device holder 321 of the excitation light shining device 310.

A plurality of heat pipes 323 are embedded in an external surface of the device holder 321. The rectilinear heat pipes 323 extend in a lateral direction (towards the front of the projector 100) of the excitation light shining device 310 to be connected to the excitation light source heat sink 325.

The main light source module 330 is also covered by the main light source top panel portion 265 and amain light source side panel portion 266 of the unit cover 261, and a lower end of the main light source side panel portion 266 is connected to the main light source bottom panel portion 257 of the unit bottom panel 253. In this way, the main light source module 330 is also formed into a closed space which are opened on a side facing the excitation light shining device 310 and a side facing the light source side optical device 380.

An outer surface of a device holder 361 which holds the red light source of the red light source device 350 is exposed as shown in FIG. 11. A heat pipe 363 is embedded in the device holder 361, and the red light source heat sink 365 which is provided to a side of the main light source module 330 and the device holder 361 are connected by the heat pipe 363.

As shown in FIG. 9, the excitation light source heat sink 325 and the red light source heat sink 365 are disposed so that passage surfaces where cooling air passing through the fins passes become parallel to each other. The first cooling fan 327, which is an axial flow blower, is disposed between both the heat sinks, whereby the excitation light source heat sink 325 is cooled by air blown from the first cooling fan 327. Then, the cooling air is discharged to an exterior of the projector 100 from the front inside air outlet port 181 in the inside air outlet ports provided on the right side plate 119 of the upper case 110.

The second cooling fan 367, which is an axial blower, is disposed on an opposite side to the first cooling fan 367 of the second light source heat sink 365, and air discharged from the second cooling fan 367 is sent to the second light source heat sink 365.

The excitation light source heat sink 325, the red right source heat sink 365, the first cooling fan 327 and the second cooling fan 367 are covered by the heat sink cover 430, as shown in FIGS. 5 and 6. The red light source heat sink 365 is positioned at the filter 435, so that outside air from the front surface side outside air inlet port 161 on the upper case 110 is sucked into an interior of the heat sink cover 430 via the filter 435, whereby heat from the red light source heat sink 365 and the excitation light source heat sink 325 is dissipated.

By adopting this construction, when the red light source and the excitation light source are lit, the red light source has a temperature which is lower than that of the excitation light source, and the red light source heat sink 365 (the red light source) having the lower temperature and the excitation light source heat sink 325 (the excitation light source) having the higher temperature can be cooled efficiently.

As shown in FIG. 6, the second cooling fan 367 is disposed inside the ventilation hole 438 which is provide in the lower bulkhead 437 of the heat sink cover 430. Consequently, the second cooling fan 367 sucks in outside air from the side surface front outside air inlet port 163 on the upper case 110 via the periphery of the heat dissipating fin 423 of the display device 420 to thereby cool the heat dissipating fin 423 used for the display device 420 by using the outside air so sucked in, and the outside air can be blown against the red light source heat sink 365.

Further, the light source side optical device 380 is also covered by the optical device top panel portion 267 and the optical device side panel portion 268 of the unit cover 261, and a lower end of the optical device side panel portion 268 is connected to the optical system device bottom panel portion 259 of the unit bottom panel 253. Because of this, the light source side optical device 380 is accommodated in a closed space which is opened on a side facing the main light source module 330 and at the portion facing the connection tube 275.

The projector 100 has the connection tube 275 which is angled obliquely upwards at an angle of 45 degrees from front ends of optical device top panel portion 267 and the optical device side panel portion 268 of the unit cover 261, and the connection pipe 275 connects the light source unit 250 with the projection optical system unit 410.

In the light source side optical device 380 of the light source unit 250, an optical axis of the light tunnel 383, that is an optical axis of the light source side optical device 380 is made parallel to an optical axis of the projection optical system unit 410, that is, an optical axis of the lens barrel 415, and the light source unit 250 is joined to the projection optical system unit 410 by a substantially L-shaped portion of the unit cover 261 which is positioned lower than the optical axis of the projection optical system unit 410 and which accommodates the light source side optical device 380.

In this way, the whole of the light source unit of the projector 100 which includes the excitation light shining device 310 including the excitation light sources which constitutes the first light source, the luminescent light emitting luminescent material device 331, the red light source device 350 and the light guiding optical system 370 which constitute the main light source module 330, and the light source side optical device 380 such as the light tunnel 383 is rested on the unit bottom panel 253 which is a substantially L-shaped flat panel and is covered by the unit cover 261 of a light metal alloy which includes the top panel portion which is substantially parallel to the unit bottom panel 253 and the side panel portion which is suspended downwards from a circumference of the top panel portion.

The projection unit case 411 of the projection optical system unit 410 to which the connection tube 275 is connected is constituted by a case front portion 412, a case central portion 413 and the case rear portion 414. The case front portion 412 is connected to a front end of the lens barrel 415. The TIR prism 389 and the display device 420 are accommodated in this case front portion 412.

The case central portion 413 supports the lens barrel 415 from therebelow and is joined to the portion of the unit cover 261 where the light source side optical device 380 is accommodated. The case rear portion 414 is connected to a rear end of the lens barrel 415, holds the aspheric mirror 417 in such a way as to accommodate it and has the glass cover 419 at the sloping portion on the upper surface.

An optical axis of the lens group of the projection optical system made up of the fixed lens group and the movable lens group 416 is normal to the image forming surface of the display device 420 and lies lower than a center of the image forming surface. Thus, the center of the image forming surface of the display device 420 is offset further upwards than the optical axis of the lens group. The center of the aspheric mirror 417 is offset further downwards than the center of the lens group of the projection optical system.

The wheel cover 345, which is formed into a thick semicircular shape, is provided on the main light source top panel portion 265 of the light source unit 250. The wheel cover 345 accommodates the wheel motor 341 which is fixed to an upper surface of the main light source top panel portion 265 of the unit cover 261, the wheel control circuit board 343 and the luminescent material wheel 333 (refer to FIG. 7).

The luminescent material wheel 333 is disposed so that part of a lower portion thereof intersects an optical path of light in the blue wavelength range which is excitation light emitted from the excitation light shining device 310. Most of the luminescent material wheel 333 is positioned above the main light source module 330 and is covered by the wheel cover 345.

The blower 391, which is the sirocco fan, is attached to an internal side of the upper panel 111 of the upper case 110 and has an inlet port 393 at a center of a lower surface thereof as shown in FIG. 13 and is fixed so as to be suspended from the upper case 110 on a right-hand side of the wheel cover 345 and in a position lying above the main light source module 330 as shown in FIG. 7.

As shown in FIGS. 5 and 6, the discharge port partition panel 135 is provided on a discharge port 395 side of the blower 391 and in a position on the heat sink cover 430.

An inlet partition panel 133 is provided on an inner side of the side surface front outside air inlet port 163 of the upper case 110. This inlet partition panel 133 is a crank shape similar to the partition rib 425 which is provided near the front end of the projection optical system unit 410 from the central position of the connector board 245, and a lower end of the inlet partition panel 133 can be connected to an upper end of the partition rib 425.

An upper bulkhead 131 is provided on a lower surface of the upper panel 111 of the upper case 110 so as to project into a U-like shape from a substantial center of the front panel 113 near the center of the upper panel 111.

This upper bulkhead 131 is connected to an upper end of the lower bulkhead 437 of the heat sink cover 430 at a lower end thereof.

A switch board 247 is attached to a lower surface of the upper case 110 in a position lying near a rear left end thereof, and the keys and indicators of the key/indicator unit 223 are fixed thereto.

Consequently, outside air which is sucked in from the side surface front outside air inlet port 163 is guided to a front space of the projection optical system unit 410 by the inlet partition panel 133 and the partition rib 425 and is introduced further into a space surrounded by the U-shaped lower bulkhead 437 which is provided above the light source side optical device 380 which is incorporated in the light source unit 250 and the upper bulkhead 131 through the heat dissipating fin 423 provided at the front end of the projection optical system unit 410.

Additionally, the outside air sucked in from the side surface front outside air inlet port 163 is sucked by the second cooling fan 367 from the ventilation hole in the lower bulkhead 437 and is then introduced into an interior of the heat sink cover 430 to be blown against the red light source heat dissipating fin 365.

As outside air sucked in from the front surface side outside air inlet port 161, outside air which passes through the filter 435 which is positioned lower than the heat sink cover 430 is sucked into the interior of the heat sink cover 430 by the first cooling fan 327 and is blown against the excitation light source heat dissipating fin 325 together with the outside air which is blown against the red light source heat dissipating fin 365 via the ventilation hole 438 and is discharged to an exterior of the projector 100 from the front inside air outlet port 181 in the right side panel 119.

The control module cooling fan 445 sucks in air inside the projector casing and discharges it from the rear inside air outlet port 185 in the right side panel 119. However, since the space which accommodates the light source unit 250 and the space at the rear of the light source unit 250 is partitioned by the partition panel 447, the circuit boards and the like which are disposed near the back panel 115 in the casing of the projector are cooled by outside air which is sucked in from the back surface side outside air inlet port 167 provided in the back plate 115 and the side surface rear outside air inlet port 165 in the left side panel 117. The control module cooling fan 445 discharges the outside air sucked into the interior of the projector 100 to the exterior of the projector 100.

The blower 391 which is disposed above the light source unit 250 sucks in air in the vicinity of the unit cover 261 of the light source unit 250 and discharges the air so sucked in so that the air is jetted towards the right side from the central inside air outlet port 183 in the right side panel 119 along an upper surface of the excitation light shining device 310.

Consequently, by adopting this construction, air is caused to pass by the first light source, which emits heat of high temperatures, very closely to thereby cool part of the excitation light shining device 310 and is then discharged to the exterior of the projector 100 while cooling the main light source module 330 in which the optical members such as the lenses and the dichroic mirrors are disposed which executes optical operations of refracting, transmitting or reflecting light of high luminance when the light is shone on thereto.

As to air sucked in by the blower 391, since the space in the light source unit 25 is partitioned at the rear thereof by the partition panel 447, at the front thereof by the heat sink cover 430, the lower bulkhead 437 and the upper bulkhead 131, and at the right-hand side thereof by the discharge port partition panel 135, outside air which passes through a flow path defined above the heat sink cover 430 and between the discharge port partition panel 135 and the upper bulkhead 131 and enters from an upper portion of the front surface side outside air inlet port 161 is sucked through an upper portion of the filter 435.

Outside air which passes through a flow path defined below the heat sink cover 430 to be sucked in from the front surface side outside air inlet port 161 through a lower portion of the filter 435 dissipates heat generated from the excitation light sources and the red light source, which constitute the heat sources of the light source unit 250 which emit heat of high temperatures, from the excitation light source heat sink 325 and the red light source heat sink 365 via the heat pipes 323, 363.

Since the heat pipes 323, 363 are straight, the arrangement of the heat sinks and the connection of the excitation light source and the red light source with the excitation light source heat sink 325 and the red light source heat sink 365 are facilitated, whereby heat from the heat sources can effectively be transferred to the heat sinks 325, 365 which constitute heat dissipating fins.

In the luminescent material wheel 333 on to which a laser beam is shone as excitation light, the wheel diameter is increased as a result of the wheel motor 341 and the rotational shaft being disposed above the unit cover 261 of the light source unit 250, and therefore, the deterioration and fatigue of the luminescent material wheel 333 by the light shone on thereto is mitigated, and the heat dissipating effect is enhanced, whereby the blower 391 is caused to suck in air warmed up and staying around the wheel cover 345 so that the wheel cover 345 and hence the luminescent light emitting luminescent material device 331 and the main light source module 330 can be cooled effectively.

Further, by adopting this construction, the diameter of the luminescent material wheel 333 can be increased, whereby not only can the life of the luminescent material wheel 333 be extended, but also the life of the light source unit 250 can be extended by utilizing the semiconductor light emitting devices for the first light source and the second light source.

In this way, since the luminescent light emitting luminescent material device 331 which includes the wheel motor 341 is disposed vertically (to stand upwards) in relation to the thickness direction of the optical unit 250, compared with a case where the luminescent light emitting luminescent material device 331 is disposed horizontally, the luminescent light emitting luminescent material device 331 can be made small in size in relation to a planar direction.

In particular, the wheel cover 345 of the luminescent light emitting luminescent material device 331 is positioned in the space above the light source unit 250 which is disposed to be aligned with the lower portion of the projection optical system unit 410 so as to avoid the interference between the projection optical system unit 410 which has the parts including the aspheric mirror 417 and the light source unit 250, which is effective to miniaturize the projector 100.

When air staying around the wheel cover 345 and air staying near the unit cover 261 of the light source unit 250 are sucked in by the blower 391, outside air to fill the space is sucked in from the front surface side outside air inlet port 161 via the filter 435, and therefore, the contamination of air staying around the light source unit 250 can be suppressed to a low level.

In this way, the blower 391 is disposed in the space above the light source unit 250 which is the vacant space lying to the side of the projection optical system unit 410 having the parts including the aspheric mirror 417 so as to stand not taller than the projection optical system unit 410, and therefore, not only can the overall thickness of the optical apparatus including the cooling parts be prevented from being increased, but also the size in the planar direction can be reduced.

In this way, in this embodiment, the unit cover 261 covers the excitation light shining device 310, the optical path of light in the blue wavelength range emitted from the excitation light shining device 310 and the lens, the diffusing plate 317 and the mirror which are disposed along the optical path, the optical path of light in the green wavelength range emitted from the luminescent material wheel 333 and the lens and the dichroic mirror which are disposed along the optical path, the red light source device 350, the optical path of light in the red wavelength range and the lens and the dichroic mirror which are disposed along the optical path, and the light source side optical device 380 which aligns the three primary colors of light on the same optical path to be guided to the TIR prism 389 which is disposed nearest to the display device 420.

The interior of the light source unit 260 is formed as the sealed space by the unit bottom panel 253 and the unit cover 261, and the light source unit 250 and the projection optical system unit 410 are connected together by the connection tube 275, whereby the light source light reflected by the light axis direction changing mirror 387 in the light source unit 250 is allowed to be incident on the projection optical system unit 410.

Consequently, in this projector 100, since the passage of the light source light is closed tightly within the casing. Therefore, the intrusion of dust in the atmosphere is interrupted, and the contamination of the various optical members can be prevented to thereby prevent the reduction in function thereof with time.

This enables the projector 100 to continue to project bright and clear images over a long period of time. The projector 100 is disposed near a wall surface, and the gradient of the projector 100 is adjusted by the legs 145 for projection of images on to the wall surface.

In the light source unit 250, the axis of light emitted from the excitation light shining device 310 which includes the first light source intersects the optical axis of the lens group of the projection optical system at right angles. The optical axis of the light tunnel 383 of the light source side optical device 380 is parallel to the optical axis of the lens group of the projection optical system. The light source side optical device 380 whose front-to-rear length is shorter than the front-to-rear length of the projection optical system unit 410 is disposed obliquely below the lens group of the projection optical system of the projection optical system unit 410.

Excluding the downwardly swelling case rear portion 414 which accommodates the aspheric mirror 417 which is centered at the position lying further downwards than the optical axis of the lens group of the projection optical system, part of the projection unit case 411, that is, part of the projection optical system unit 410 and part of the light source unit 250 overlap, and the light source unit 250 and the projection optical system unit 410 are connected together by the connection tube 275 which is inclined at the inclination angle of 45 degrees.

By adopting this construction, the light source light reflected by the light axis direction changing mirror 387 of the light source unit 250 is caused to be incident on the TIR prism 389 which is disposed nearest to the front surface of the display device 420 of the projection optical system unit 410.

Consequently, the whole of the light source unit 250 which is the light source unit including the light source and the image light forming device and the projection optical system unit 410 can be made small in size, and thus, the projector 100 which is the image projection system can be made small in size.

In joining the L-shaped light source unit 205 and the projection optical system unit 410 together integrally, the light source unit 205 and the projection optical system unit 410 are disposed to be so joined in such a way that the axis of light emitted from the excitation light shining device 310 intersects the optical axis of the lens group of the projection optical system which extends in the front-to-rear direction of the projector 100 substantially at the center of the projection optical system unit 410. Then, the heat sinks which are heat dissipating fins for the light sources which generate heat of high temperatures are collected in the right front space of the L-shaped light source unit 250 which corresponds to the right front corner position of the projector 100.

Namely, the excitation light source heat sink 325, which dissipates heat generated from the excitation light sources which are the heat sources of the light source unit 250 generating heat of high temperatures, and the red light source heat sink 365, which dissipates heat generated from the red light source which is the heat source of the light source unit 250 generating heat of high temperatures, although not as high as the excitation light sources, are collected so as to be aligned side by side. Then, the first cooling fan 327 is disposed between the excitation light source heat sink 325 and the red light source heat sink 365.

By adopting this construction, the excitation light source heat sink 325 is allowed to dissipate heat from the excitation light sources with the air passing through the red light source heat sink 365 to arrive thereat and outside air sucked in from the front surface side outside air inlet port 161 in the front panel 113. Then, the air so used is discharged to the exterior of the projector 100 from the front inside air outlet port 181 in the right side panel 119. By adopting this construction, the excitation light sources can effectively be cooled which are the light sources generating heat of high temperatures and having the highest heat releasing value in the light source unit 250.

The excitation light shining device 310 and the red light source device 350 are connected to the excitation light source heat sink 325 and the red light source heat sink 365 by the heat pipe 323 and the heat pipe 363, respectively, via the cover rear wall portion 433 of the heat sink cover 430.

Consequently, the cover rear wall portion 433 functions as a bulkhead, that is, a duct for cooling air from the first cooling fan 327, whereby the excitation light shining device 310 and the red light source device 350, which constitute the heat sources, can be cooled preferably by the first cooling fan 327 with the light source unit 250 being not affected by dust in the cooling air.

In this embodiment, further, the light source unit case 251 accommodates the light sources, the luminescent material wheel 333, and the light guiding optical system 370, and therefore, the excitation light shining device 310 and the red light source device 350, which constitute the heat sources, can be cooled preferably by the first cooling fan 327 with the light source unit 250 being not affected further by dust in the cooling air.

Further, the second cooling fan 367 is disposed on the side of the red light source heat sink 365 which is opposite to the side where the first cooling fan 327 is provided. This second cooling fan 367 sucks outside air into the projector 100 from the side surface front outside inlet port 163 in the left side panel 117, whereby heat is dissipated from the heat dissipating fin 423 provided at the front end of the projection optical system unit 410 by the outside air so sucked in, cooling thereby the display device 420 which constitutes the heat source.

Thereafter, the air that has passed through the heat dissipating fin 423 is blown against the red light source heat sink 365 by the second cooling fan 367. By adopting this configuration, the red light source, which is the second light source, can effectively be cooled.

In addition, the excitation light source heat sink 325, the red light source heat sink 365, the first cooling fan 327 and the second cooling fan 367 are arranged so as to be covered by the heat sink cover 430. Then, the outside air sucked in from the side surface front outside air inlet port 163 cools the display device 420, which constitutes the heat source generating heat of relatively low temperatures, and then the red light source, which constitutes the heat source generating heat of relatively high temperatures. Then, the air which has cooled the red light source and fresh outside air sucked in from the front surface side outside inlet port 161 are mixed together to cool the excitation light sources generating heat of the highest temperatures and having the high heat releasing value. Thereafter, the heat absorbed air is discharged directly to the exterior of the projector 100, thereby making it possible to cool the heat sources and the projector 100 effectively.

The device holder 321, which holds the excitation light sources so that the axes of lights emitted from the excitation light shining device 310 become parallel to the axis of light emitted from the red light source device 350, and the device holder 361, which holds the red light source, are disposed parallel to each other, and the excitation light source heat sink 325 and the red light source heat sink 365, which constitute the cooling devices for the heat generating sources, are collected in the right front space of the light source unit 250 which is formed in to the L-like shape by the rectilinear heat pipes 323, 363. This can facilitate the attainment of miniaturization of light source unit 250 and the optical apparatus for the projector and thus the projector 100.

The circuit boards are collectively disposed in the space lying to the right of the projection optical system unit 410 and at the rear of light source unit 250, and this space is isolated from the other spaces in the projector 100 by the partition panel 447. Then, outside air is sucked in from the back surface side outside air inlet port 167 in the back surface plate 115, and the outside air so sucked in dissipates heat generated from the various circuits and is then discharged to the exterior of the projector 100 from the rear inside air outlet port 185 in the right side panel 119 by the control module cooling fan 445.

This enables the heat generating sources in the projector 100 to be cooled effectively while making the projector 100 small in size.

Consequently, the various circuits and circuit devices which are provided on the main control circuit board 441 and the power supply control circuit board 443, which constitutes the heat generating source, are cooled by outside air which is sucked in from the back surface side outside air inlet port 167 in the back panel 115 by the control module cooling fan 445, and the outside air which has dissipated the heat from the circuit boards and circuit devices is then discharged directly from the rear inside air outlet port 185 in the right side panel 119 to the exterior of the projector 100.

The light sources, which are the excitation light sources and the red light source, and the display device 420 are cooled by outside air sucked in from the other outside air inlet ports than those in the back panel 115. Namely, cooling air which is sucked in from exterior portions of the projector 100 through the outside air inlet ports in the front panel 113 and the left side panel 117 cools the heat dissipating fin 423 for the display device 420 generating heat of lower temperatures and having a lower heat releasing value than those of the light sources and then cools the red light source heat sink 365 and the excitation light source heat sink 325 which constitute the heat dissipating fins for the light sources generating heat of high temperatures, thereafter being discharged to the exterior of the projector 100.

The optical members which pass through or reflect highly bright light are surrounded by the light source unit case 251, and air surrounding the unit cover 261 made of a light metal alloy having a high heat conductivity is sucked in by the blower 391. Fresh outside air which is sucked in from the front surface side outside air inlet port 161 and which passes over the cover upper panel 431 of the heat sink cover 430 can be supplied to the periphery of the light source unit case 251.

This also enables heat generated from the optical members which reflect or refract highly bright light to be absorbed via the light source unit case 251 having the high heat conductivity to thereby enable heat generated from the whole of the light source unit 250 to be dissipated, thereby making it possible to prevent an increase in temperature of the light source unit 250 effectively.

The filter 435 is provided on the inner side of the front surface side outside air inlet port 161 to remove dust in outside air sucked in. This can clean outside air to be guided to the periphery of the light source unit 250. This, together with the fact that the light source unit 250 is accommodated in the light source unit case 251, can prevent a reduction in functionality of the optical devices by preventing the contamination of the optical devices even though the light source unit 250 is used for a long period of time.

Figure 14A:
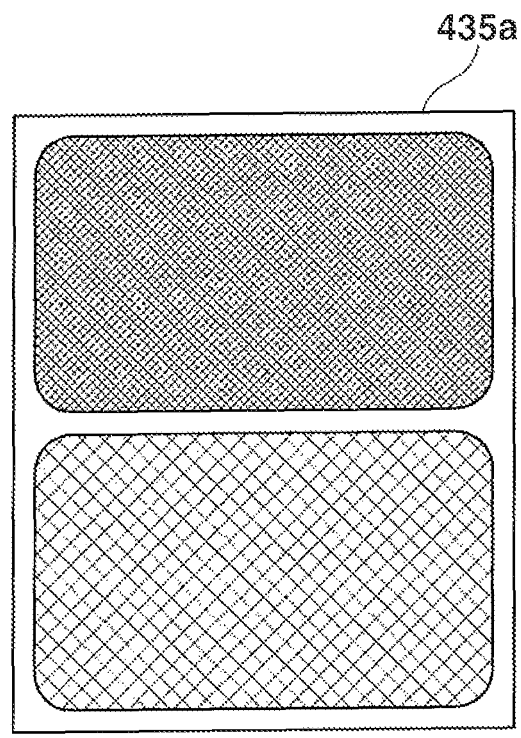
FIGS. 14A and 14B shows modified examples of filters according to the embodiment of the invention.

In the embodiment shown in FIGS. 5 and 6, the filter 435 is described as standing from near the lower end to near the upper end of the front panel 113. However, the filter 435 may be provided so as to be present only at a portion which lies further upwards than the cover upper panel 431 of the heat sink cover 430. Additionally, as shown in FIG. 14A, there may be provided a filter 435*a* having different mesh portions for a lower portion and an upper portion than the cover upper panel 431, wherein a mesh size of the upper portion which lies further upwards than the cover upper panel 431 is smaller than a mesh size of the lower portion which lies further downwards than the cover upper panel 431.

By making the mesh size of the upper portion of the filter smaller, cooling air to be sucked and directed towards the light source unit 250 can be made cleaner than cooling air to be sucked to cool the heat sinks, thereby making it possible to realize a preferable cooling.

Figure 14B:
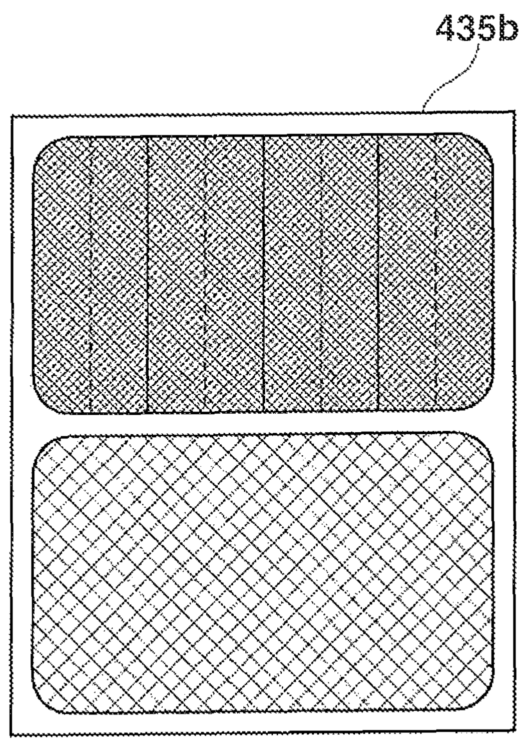

As this occurs, as shown in FIG. 14B, it is preferable to have a pleated filter 435*b* which has vertical ridges and roots so as to make filter surface area larger. By forming the filter 435*b* in that way, in sucking in outside air, resistance to air sucked can be reduced, allowing outside air to be sucked into the interior of the projector 100 effectively.

In addition, the filter 435 (435*a*, 435*b*) may be detachable (replaceable). This facilitates the cleaning and maintenance of the filter.

Figure 15:
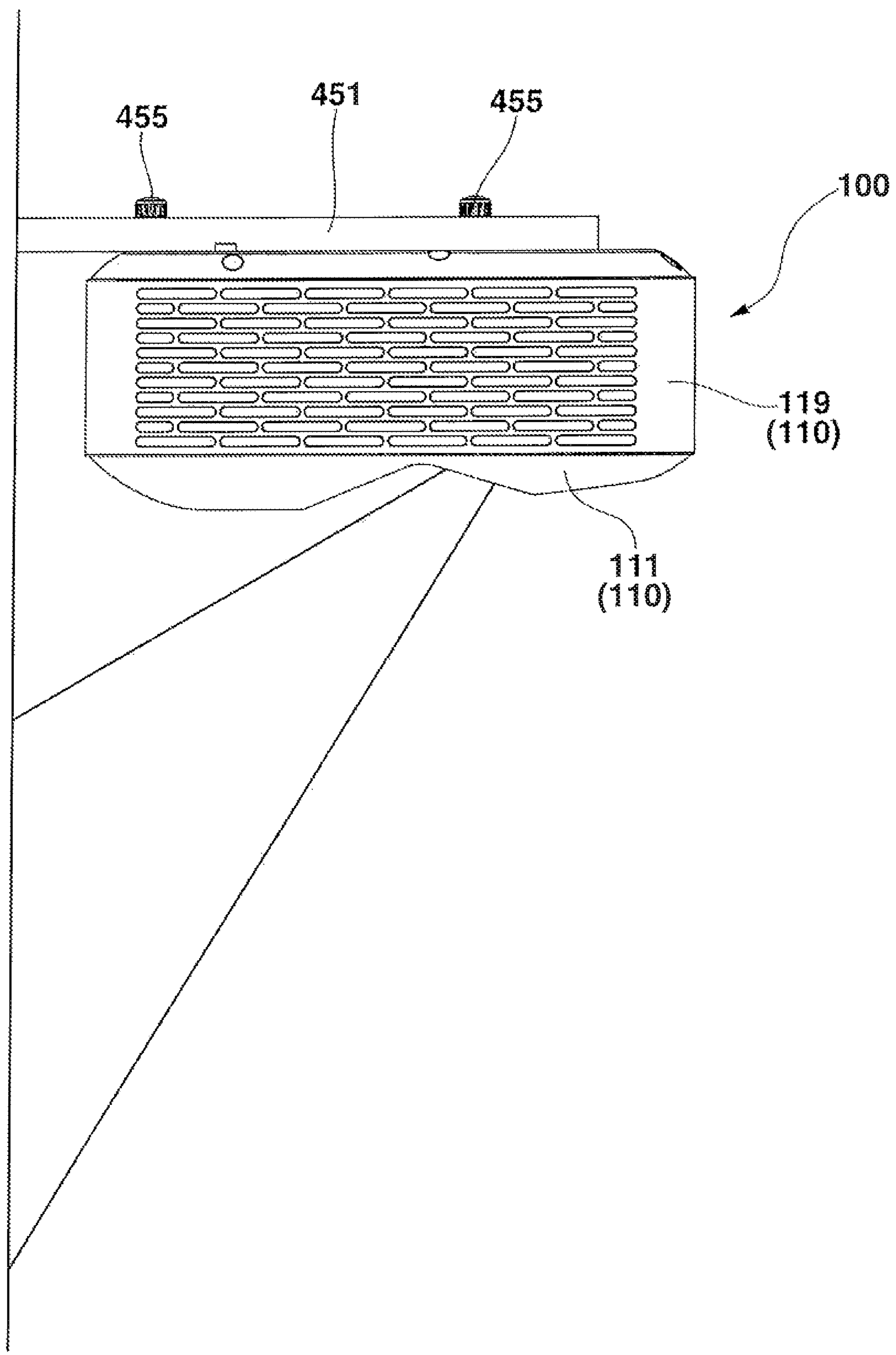
FIG. 15 is a view showing an example of use modes of the projector according to the embodiment of the invention.

Additionally, as shown in FIG. 15, the projector 100 may be attached to a metal hanger 451 which is fixed to an upper portion of a wall surface or to an upper end of a white board with attaching screws 455 by removing the legs 145 from the bottom panel 141 of the projector 100.

Although the projector 100 which is an image projection system is described as the projector 100 for proximity projection having the aspheric mirror 417, the projector 100 may be a normal projector which has no aspheric mirror 417 and in which image light formed at a display device 420 is projected as it is to the front of the display device 420 via a projection lens group.

The embodiments that have been described heretofore are presented as the examples and are not intended to limit the scope of the invention. These novel embodiments can be carried out in other various forms, and various omissions, replacements and/or modifications can be made thereto without departing from the spirit and scope of the invention. The resulting embodiments or their modifications are contained in the spirit and scope of the invention and are also contained in the scope of inventions claimed under claims and their equivalents.

What is claimed is:

1. A light source unit comprising:

a first light source;

a second light source;

a first heat sink for the first light source which is disposed to a side of the first light source;

a second heat sink for the second light source which is disposed to a side of the second light source;

a first cooling fan for sending air to the first heat sink and which is disposed between the first heat sink and the second heat sink in such a way that a blowing direction thereof is substantially parallel to a direction in which the first heat sink and the second heat sink are aligned; and a second cooling fan for sending air to the second heat sink and which is provided on a side of the second heat sink which is opposite to a side where the first heat sink is disposed, wherein the first light source and the first heat sink are connected together by a first heat pipe via a bulkhead, and wherein the second light source and the second heat sink are connected together by a second heat pipe via the bulkhead.

2. The light source unit according to claim 1, wherein the first light source is heated to a higher temperature than the second light source, and wherein the first heat sink is disposed downstream of the first cooling fan.

3. The light source unit according to claim 1, comprising further comprising:

a luminescent material wheel which is partially disposed on an axis of light emitted from the first light source; and a light guiding optical system which aligns light emitted from the first light source, light emitted from the second light source and luminescent light emitted from the luminescent material wheel for emission therefrom, wherein the light source unit which includes the first light source, the second light source, the luminescent material wheel and the light guiding optical system is accommodated in a light source unit case.

4. The light source unit according to claim 2, comprising further comprising:

a luminescent material wheel which is partially disposed on an axis of light emitted from the first light source; and a light guiding optical system which aligns light emitted from the first light source, light emitted from the second light source and luminescent light emitted from the luminescent material wheel for emission therefrom, wherein the light source unit which includes the first light source, the second light source, the luminescent material wheel and the light guiding optical system is accommodated in a light source unit case.

5. The light source unit according to claim 4, wherein the light source unit case includes a flat unit bottom panel and a unit cover, and wherein the unit cover has a top panel portion which faces the unit bottom panel and a side panel portion which is suspended from a circumference of the top panel portion.

6. The light source unit according to claim 1, wherein an axis of light emitted from the first light source and an axis of light emitted from the second light source are parallel.

7. The light source unit according to claim 2, wherein an axis of light emitted from the first light source and an axis of light emitted from the second light source are parallel.

8. The light source unit according to claim 3, wherein an axis of light emitted from the first light source and an axis of light emitted from the second light source are parallel.

9. The light source unit according to claim 1, wherein the first heat pipe and the second heat pipe are rectilinear.

10. The light source unit according to claim 2, wherein the first heat pipe and the second heat pipe are rectilinear.

11. The light source unit according to claim 3, wherein the first heat pipe and the second heat pipe are rectilinear.

12. The light source unit according to claim 1, wherein the first heat sink and the second heat sink receive a mixture of air which passes through a display device cooling fin and outside air sucked in directly from an exterior.

13. The light source unit according to claim 2, wherein the first heat sink and the second heat sink receive a mixture of air which passes through a display device cooling fin and outside air sucked in directly from an exterior.

14. The light source unit according to claim 3, wherein the first heat sink and the second heat sink receive a mixture of air which passes through a display device cooling fin and outside air sucked in directly from an exterior.

15. A projector comprising:

a light source unit comprising:

a first light source;

a second light source;

a first heat sink for the first light source which is disposed to a side of the first light source;

a second heat sink for the second light source which is disposed to a side of the second light source;

a first cooling fan for sending air to the first heat sink and which is disposed between the first heat sink and the second heat sink in such a way that a blowing direction is substantially parallel to a direction in which the first heat sink and the second heat sink are aligned; and a second cooling fan for sending air to the second heat sink and which is provided on a side of the second heat sink which is opposite to a side where the first heat sink is disposed, wherein the first light source and the first heat sink are connected together by a first heat pipe via a bulkhead, and wherein the second light source and the second heat sink are connected together by a second heat pipe via the bulkhead;

a display device to which light emitted from the light source unit is shone to form image light;

a projection optical system which projects the image light formed by the display device on to a screen; and a projector control unit which controls the display device and the light source unit.

16. The light source unit according to claim 15, further comprising:

a base board on which the projector control unit is provided and which is disposed on a side of the first light source and the luminescent material wheel which is opposite to a side where the first heat sink is provided; and a fan for discharging air surrounding the base board to an exterior of the projector.

* * * * *

UNITED STATES PATENT AND TRADEMARK OFFICE

CERTIFICATE OF CORRECTION

PATENT NO. : 9,625,798 B2
APPLICATION NO. : 14/664459
DATED : April 18, 2017
INVENTOR(S) : Toshifumi Kase It is certified that error appears in the above-identified patent and that said Letters Patent is hereby corrected as shown below:

In the Claims

Column 20, Line 37, before "further" delete "comprising".

Column 20, Line 50, before "further" delete "comprising".

Signed and Sealed this
Eleventh Day of July, 2017

Joseph Matal

Joseph Matal
*Performing the Functions and Duties of the Under Secretary of Commerce for Intellectual Property and Director of the United States Patent and Trademark Office*